United States Patent

Bosonnet et al.

[15] 3,689,701

[45] Sept. 5, 1972

[54] MULTISIGNALLER ASSOCIATED WITH A TIME DIVISION MULTIPLEX SWITCHING CENTER

[72] Inventors: Marc Edgar Marie Bosonnet, Paris; Michel Andre Robert Henrion, Boulogne, both of France; Jean-Pierre LeCorre, deceased, late of Sainte-Genevieve-Des-Bois, France by Yuette Marie Laurence Le Corre, administratrix

[73] Assignee: International Standard Electric Corporation, 2, New York, N.Y.

[22] Filed: March 31, 1970

[21] Appl. No.: 24,115

[30] Foreign Application Priority Data

March 21, 1969 France......................6908270

[52] U.S. Cl...............................179/18 J, 179/15 BY

[51] Int. Cl................................................H04j 3/12

[58] Field of Search..179/18 J, 18 ES, 15 AT, 15 BY

[56] References Cited

UNITED STATES PATENTS 3,492,430 1/1970 Vigliante..............179/15 AT 3,401,235 9/1968 Corbin et al. ............179/18 J

*Primary Examiner*—Kathleen H. Claffy
*Assistant Examiner*—Thomas W. Brown
*Attorney*—C. Cornell Remsen, Jr., Walter J. Baum, Percy P. Lantzy, J. Warren Whitesel, Delbert P. Warner and James B. Raden

[57] ABSTRACT signalling Instructions connected to a PCM switching network in the same way as a number of trunks. The information it receives is in the form of program instructions supplied from a central processor. The signalling unit is so organized that it may process simultaneously 96 instructions controlling as many different operations in a selected exchange (supermultiplex of 192 channels). Three different types of instructions are provided. These instructions may be grouped into programs capable of controlling the functions of a telephone central exchange.

The instructions are as follows:

1. instructions which control a data transfer between the signalling unit and one junctor,
2. Instructions which control the supervision of the line and establish the digit analysis and the digit transmission, and
3. Instructions which control the switching network path check.

6 Claims, 39 Drawing Figures

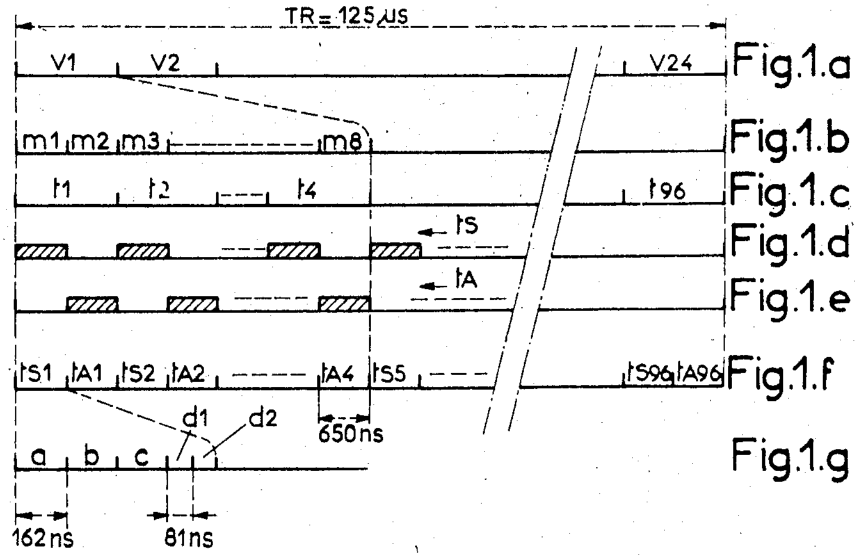
Fig.1.a Fig.1.b Fig.1.c Fig.1.d Fig.1.e Fig.1.f Fig.1.g
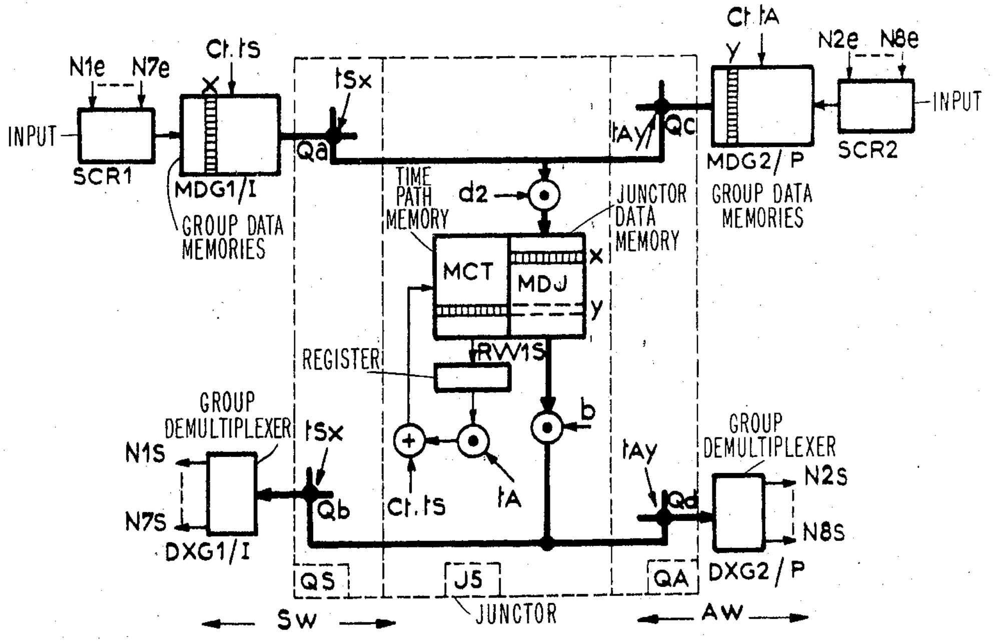
FIG.3
Inventors
M.E.M.BOSONNET-M.A.R.HENRION-
J. P. LE CORRE, DECEASED,
BY YVETTE M. L. LE CORRE, ADMINSTRATRIX
By B. B. Warner
Attorney

*Inventors*
M.E.M.BOSONNET-M.A.R.HENRION-
J. P. LE CORRE, DECEASED,
BY YVETTE M. L. LE CORRE, ADMINISTRATRIX
By O. O. Warner
*Attorney*

*Inventors*
M.E.M.BOSONNET-M.A.R.HENRION-
J. P. LE CORRE, DECEASED.
BY YVETTE M. L. LE CORRE, ADMINISTRATRIX
By J. B. Warner
*Attorney*

Inventors
M.E.M.BOSONNET-M.A.R.HENRION-
J.P. LE CORRE, DECEASED.
BY YVETTE M. L. LE CORRE, ADMINISTRATRIX By O. P. Warner
Attorney

*Inventors*
M.E.M.BOSONNET-M.A.R.HENRION-
J. P. LE CORRE, DECEASED,
BY YVETTE M. L. LE CORRE,
ADMINISTRATRIX
*By* D.A. Warner
*Attorney*

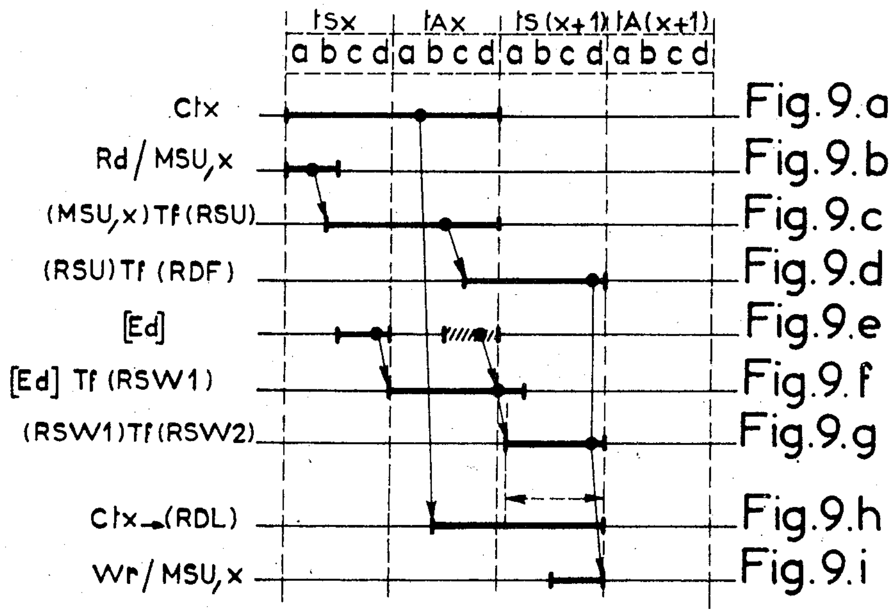
Fig.9.a
Fig.9.b
Fig.9.c
Fig.9.d
Fig.9.e
Fig.9.f
Fig.9.g
Fig.9.h
Fig.9.i
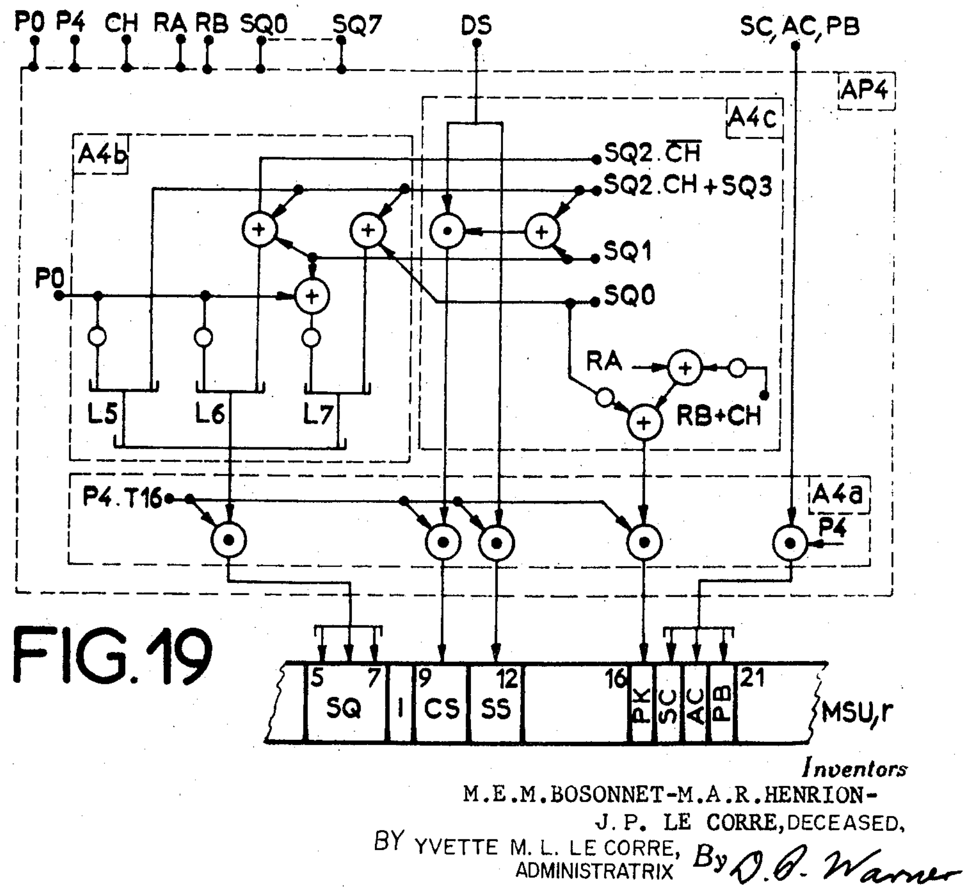
FIG.19
*Inventors*
M.E.M.BOSONNET-M.A.R.HENRION-
J.P. LE CORRE, DECEASED,
BY YVETTE M. L. LE CORRE, ADMINISTRATRIX By D. G. Warner
*Attorney*

*Inventors*
M.E.M.BOSONNET-M.A.R.HENRION-
J. P. LE CORRE, DECEASED.
BY YVETTE M. L. LE CORRE, ADMINISTRATRIX *By* [signature]
*Attorney*

*Inventors*
M.E.M.BOSONNET-M.A.R.HENRION-
J. P. LE CORRE, DECEASED,
BY YVETTE M. L. LE CORRE, ADMINISTRATRIX
*By* O. B. Warner
*Attorney*

*Inventors*
M.E.M.BOSONNET-M.A.R.HENRION-
J. P. LE CORRE, DECEASED,
BY YVETTE M. L. LE CORRE, ADMINISTATRIX
By D. G. Warner
*Attorney*

*Inventors*
M.E.M.BOSONNET-M.A.R.HENRION-
J. P. LE CORRE, DECEASED.
BY YVETTE M. L. LE CORRE, ADMINISTRATRIX
By D. B. Warner
*Attorney*

Inventors
M.E.M.BOSONNET-M.A.R.HENRION-
J.P. LE CORRE, DECEASED.
BY YVETTE M. L. LE CORRE,
ADMINISTRATRIX By J. O. Warner
Attorney Inventors
M.E.M.BOSONNET-M.A.R.HENRION-
J. P. LE CORRE, DECEASED.
BY YVETTE M. L. LE CORRE, ADMINISTRATRIX
By O. G. Warner
Attorney

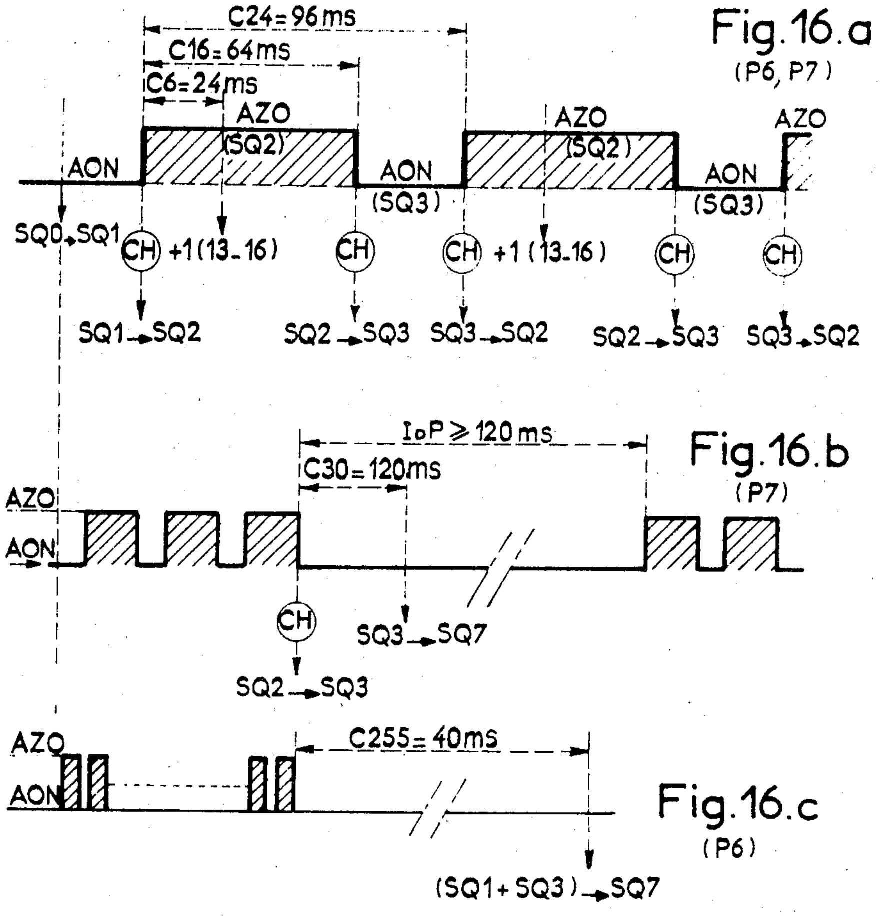
Fig. 16.a Fig. 16.b Fig. 16.c
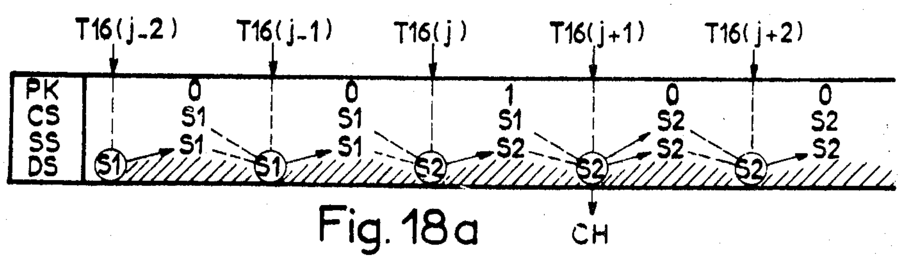
Fig. 18a
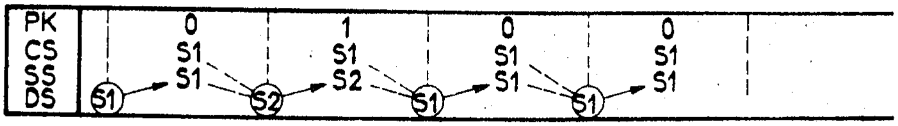
Fig. 18b
Inventors
M.E.M.BOSONNET-M.A.R.HENRION-
J. P. LE CORRE, DECEASED,
BY YVETTE M. L. LE CORRE,
ADMINISTRATRIX
By O. O. Warner
Attorney

*Inventors*
M.E.M.BOSONNET-M.A.R.HENRION-
J. P. LE CORRE, DECEASED,
BY YVETTE M. L. LE CORRE, ADMINISTRATRIX By [signature]
*Attorney*

Inventors
M.E.M.BOSONNET-M.A.R.HENRION-
J. P. LE CORRE, DECEASED,
BY YVETTE M. L. LE CORRE,
ADMINISTRATRIX By O. B. Warner
Attorney Inventors
M.E.M.BOSONNET-M.A.R.HENRION-
J.P.LE CORRE, DECEASED,
BY YVETTE M. L. LE CORRE, ADMINISTRATRIX
By O. B. Warner
Attorney

MULTISIGNALLER ASSOCIATED WITH A TIME DIVISION MULTIPLEX SWITCHING CENTER

The present invention concerns a multisignaller associated with a time division multiplex pulse code modulation (PCM) switching center. This multisignaller, connected to the switching network of the center as if it were a trunk, interprets, in time division multiplex, a plurality of instructions concerning different programs and controls different elementary switching functions by using the switching network for the transmission of data. The instructions are supplied by a "switching computer" which plays the role of a centralized control circuit, the association of said computer and of the multisignaller constituting a multiprogrammed data processing system.

In the course of the description, several french patent applications filed by the applicant will be quoted. They are referenced a, b, c as follows:

a. French Pat. No. 1,586,200 filed on Sept. 12, 1968 and entitled: "Synchronization circuit in a PCM central exchange", (M.J. Herry et al. 3-2).

b. Patent application no 6,901,888 filed on Jan. 30, 1969 and entitled: "Time-multiplex switching center", (J.G. Dupieux et al. 5-1-13-1).

c. Patent application no 6,904,113 filed on Feb. 19, 1969 and entitled: "Signalling supervision unit", (B.P.J. Durteste et al. 1-2-2).

The PCM Switching Center to which the multisignaller according to the invention is associated may be, by way of example, the tandem switching Center described in the Patent application referenced b. In this Switching Center, a plurality of groups of trunks comprising each $g = 192$ channels are connected to one end of a space switching network the other end of which is connected to junctors controlling the time switching. These space and time switchings enable to connect any two channels belonging either to two different groups or to the same group.

The data which controls these switchings is constituted by codes stored in time and space path memories with cyclic readout which are located in the junctors. A connection is set up by writing codes at the suitable addresses and it is broken by writing therein zero codes.

The different functions which must be performed in a Switching Center may be grouped as follows:

1 - Scanning of the channels for call detection,

2 - Supervision of the signalling data received over the channels,

3 - Transmission of signalling data towards a remote Switching Center,

4 - Path search and identification in the switching network,

5 - Data modifications which control the setting up and breaking of connections.

In the French pat. no 1,303,135 filed on July 27, 1961 and entitled: "PCM switching stage and its associated circuits", there is described a marker circuit controlled by direct access to the path memories to secure information relating to, the performance of the path search, path identification and data modification functions.

In the present invention, these functions as well as those referenced 1, 2 and 3 in the above list are carried out by means of one or several multisignallers which are connected to the switching network as if they were groups of trunks.

A multisignaller is provided for interpreting simultaneously, by means of internal wired logic, $g/2$ instructions supplied directly by the Switching Computer. Each one of these instructions belongs to a program stored in the memory of the computer and which is provided for controlling either a call or connection operation (digit reception, setting up of a connection etc.) or a supervision operation (detection of a call, for instance).

For carrying out this instruction processing, the multisignaller establishes a connection either with a junctor when the instruction concerns the modification or the collection of codes or with a channel in a group of trunks when the instruction concerns the supervision of the signalization associated to the channel or the transmission of signalling data towards a remote center.

All this data is transmitted in a coded form in the same way as the messages exchanged between a calling subscriber and a called subscriber and it is seen that there is full compatibility between both types of information.

On the other hand, the combination of stored programs available in the computer and of the wired program associated to the multisignaller simplifies the programming of the system and provides for a high flexibility of exploitation for the whole system.

The object of the present invention is thus to control, in a PCM Switching Center, the performance of all types of switching functions such as the command of the switching network, the signalling supervision, the line scanning etc... by means of a signaller using, as an information transmission network, the switching network provided for the transmission of messages exchanged between the subscribers.

Another object of the invention is to assure the simultaneous processing of a plurality of different operations by grouping several signallers in a multisignaller, said signallers operating in time multiplex.

According to the invention, means have been provided for connecting a multisignaller to the switching network in the same way as a group of trunks is connected to said network, means for carrying out data transfers between a multisignaller and the Switching Computer in the same way as a group circuit carries out data transfers with remote Switching Centers, said transfer operation being carried out under the control of instructions taken in a set of n instructions and which belong to a plurality of computer programs.

According to another characteristic of the invention there are provided in each multisignaller, memory means comprising a memory of $g/2$ addresses, each address or signaller being used for storing the data related to one operation and data processing means comprising $n$ wired logic instruction processing circuits.

According to another characteristic of the invention there are provided first means for connecting a signaller to a junctor, through the switching network, in order to carry out - in said junctor - data collection, data modification and data check operations (instructions P9 and P11), second means for connecting a signaller, through the switching network and a junctor, either to a channel in a group or to a connection whereupon digits are transmitted for carrying out either the supervision of the incoming signalization (instructions P4, P5, P6, P7) or the transmission of digits (instruction P2) and third means for connecting together two signallers, through the switching network and a junctor, for carrying out a data exchange for checking the path which connects them (instruction P1).

The above mentioned and other features and objects of this invention will become apparent by reference to the following description taken in conjunction with the accompanying drawings in which:

FIGS. 1.*a* to 1.*g* represent the diagrams of the clock signals used in the PCM Switching Center;

FIG. 3 represents an "unfolded" diagram of the circuits used for a given connection;

Figure 10:
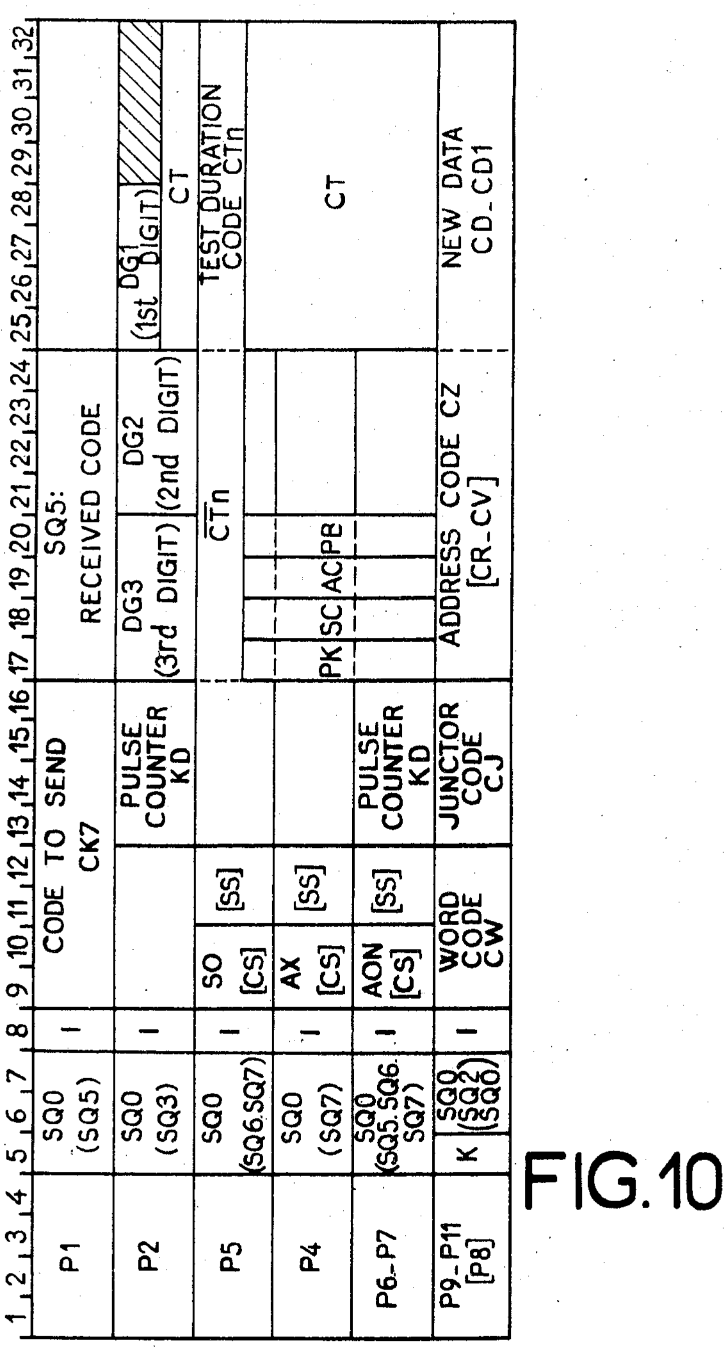
Figure 11:
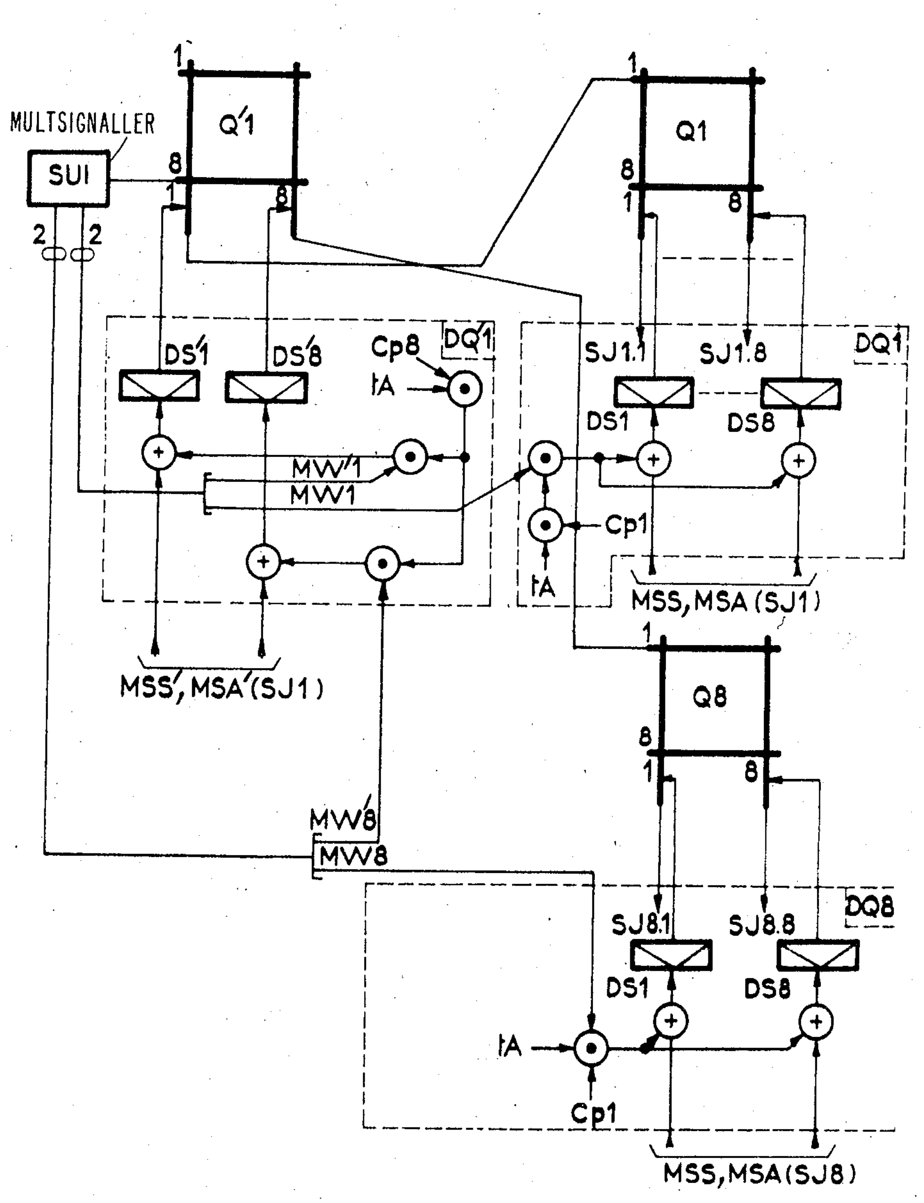
Figure 12:
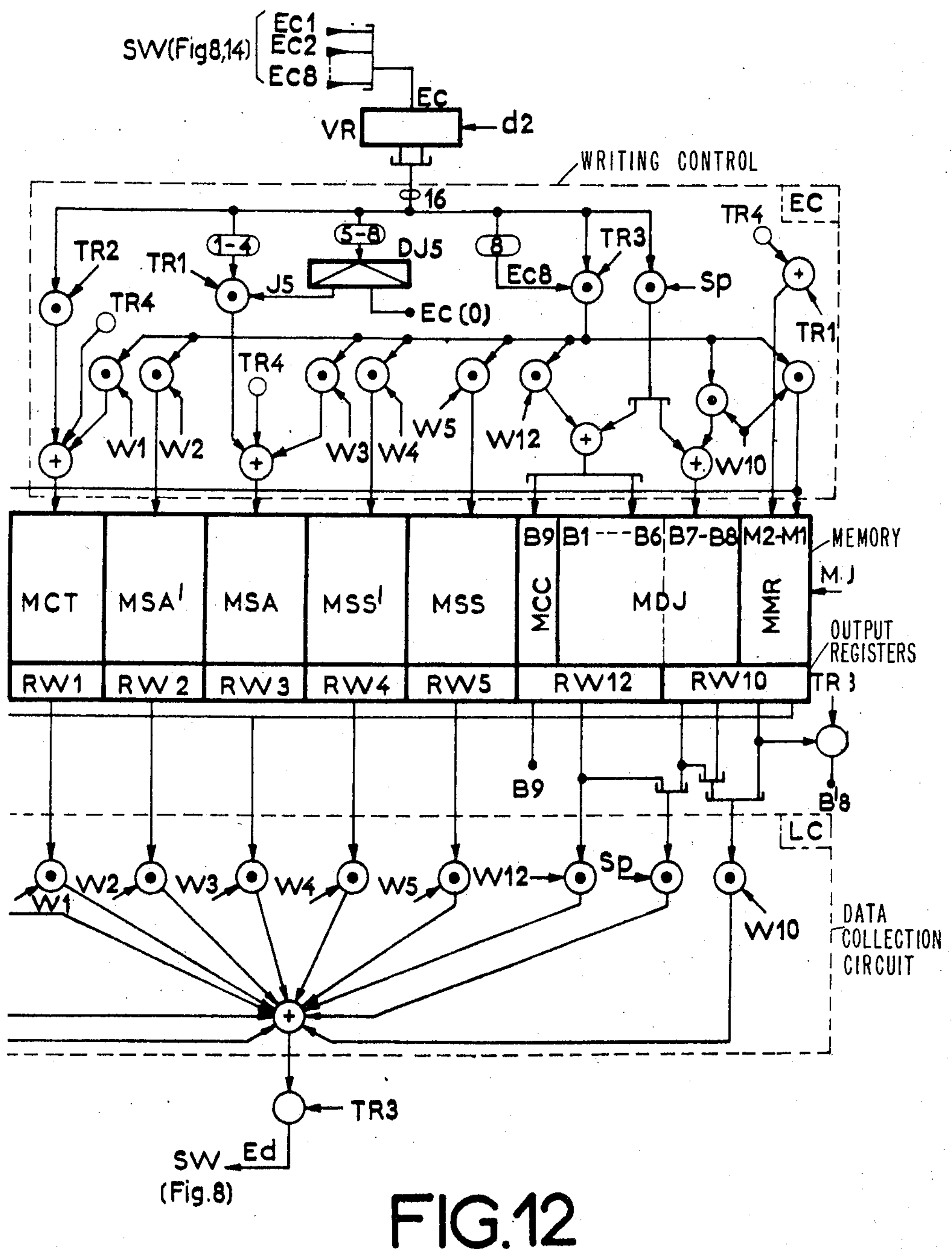
Figure 13:
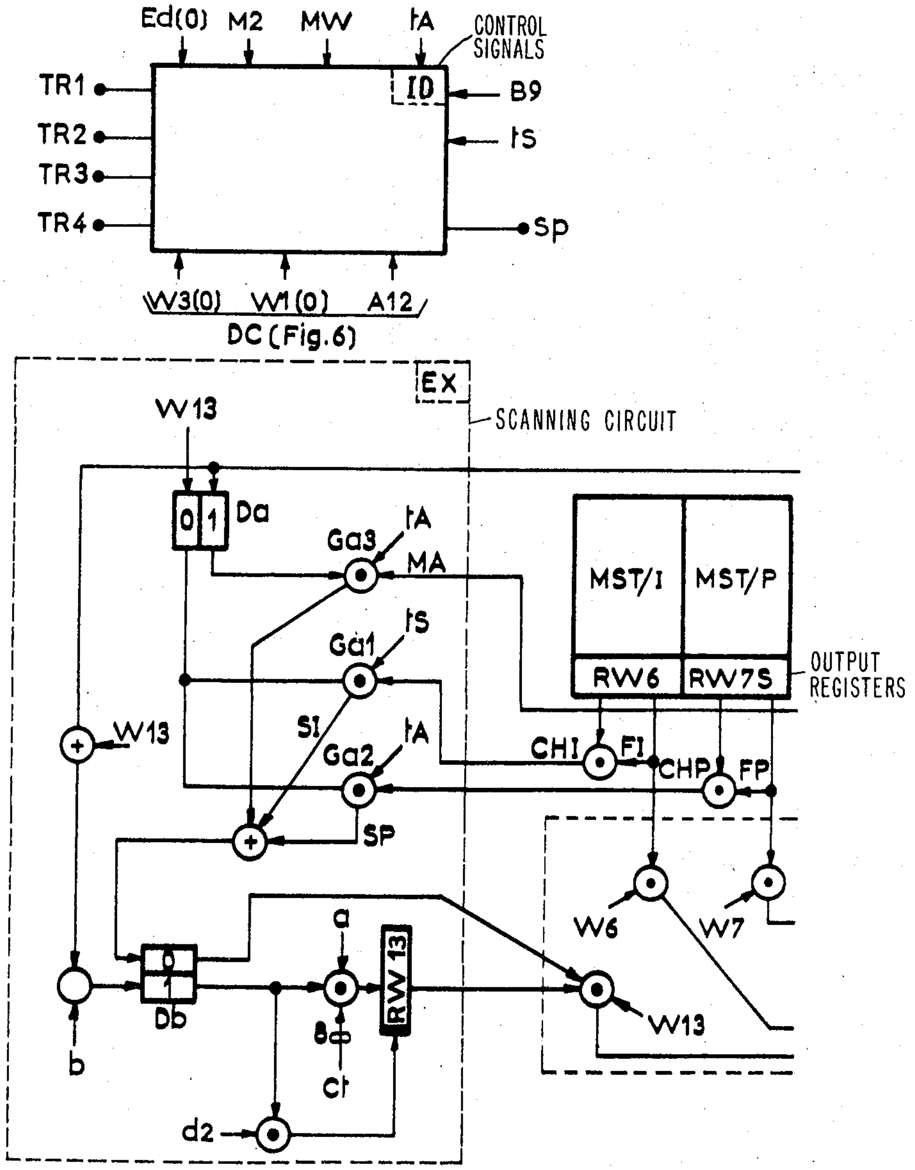
Figure 14:
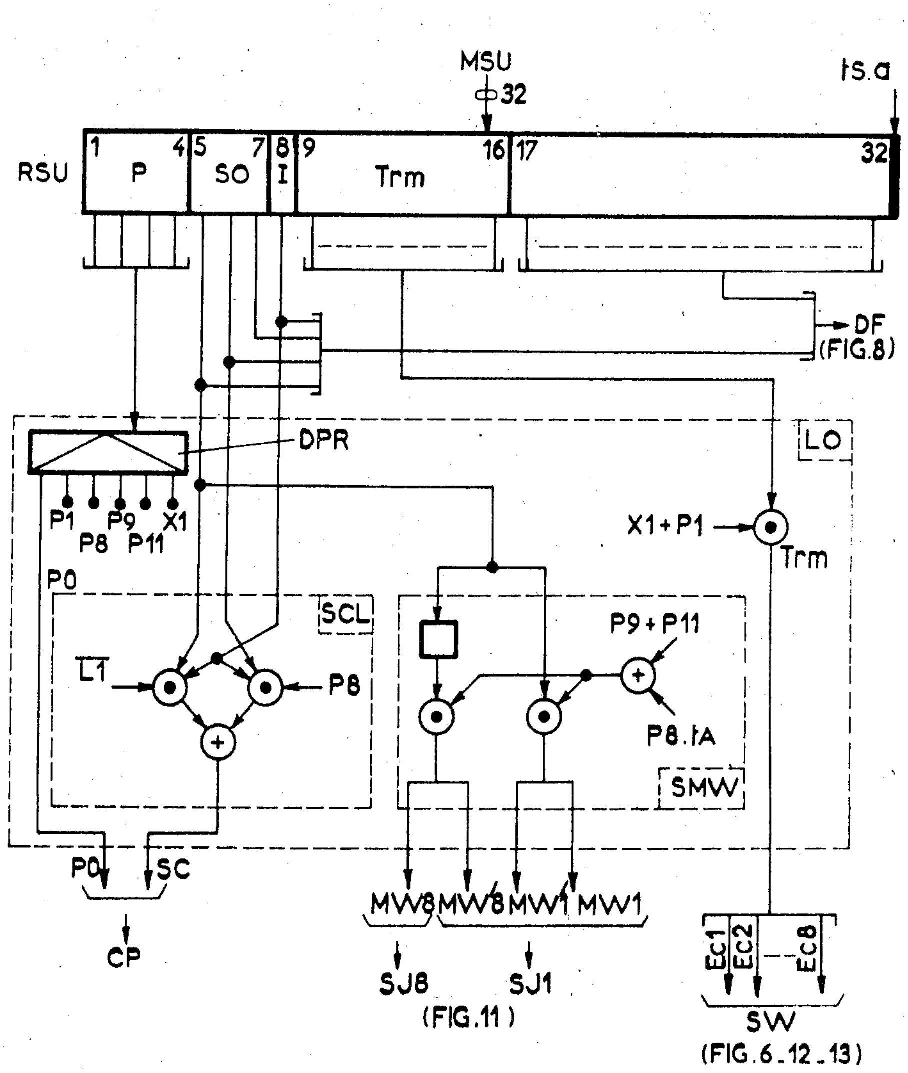
Figure 15:
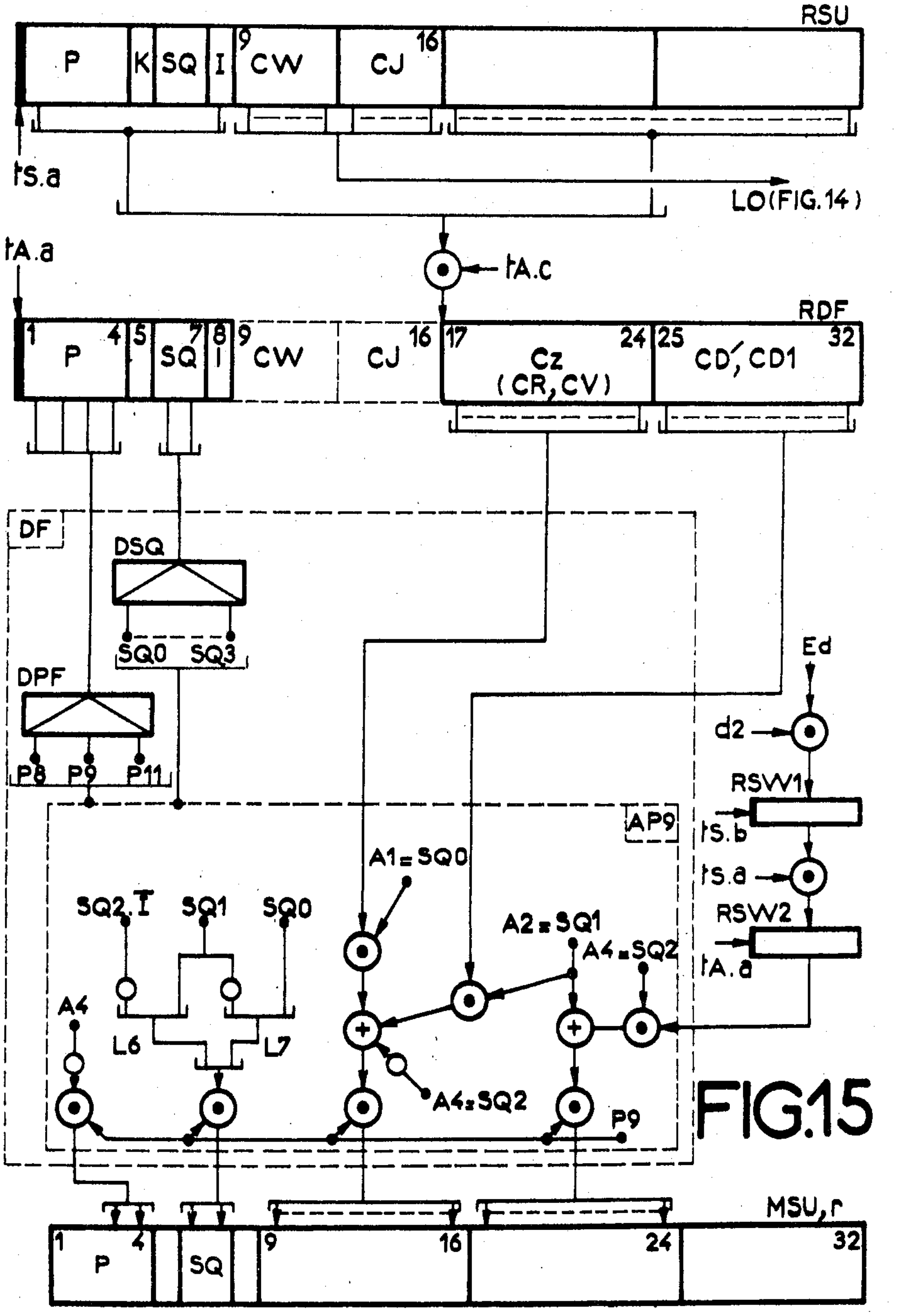
Figure 17:
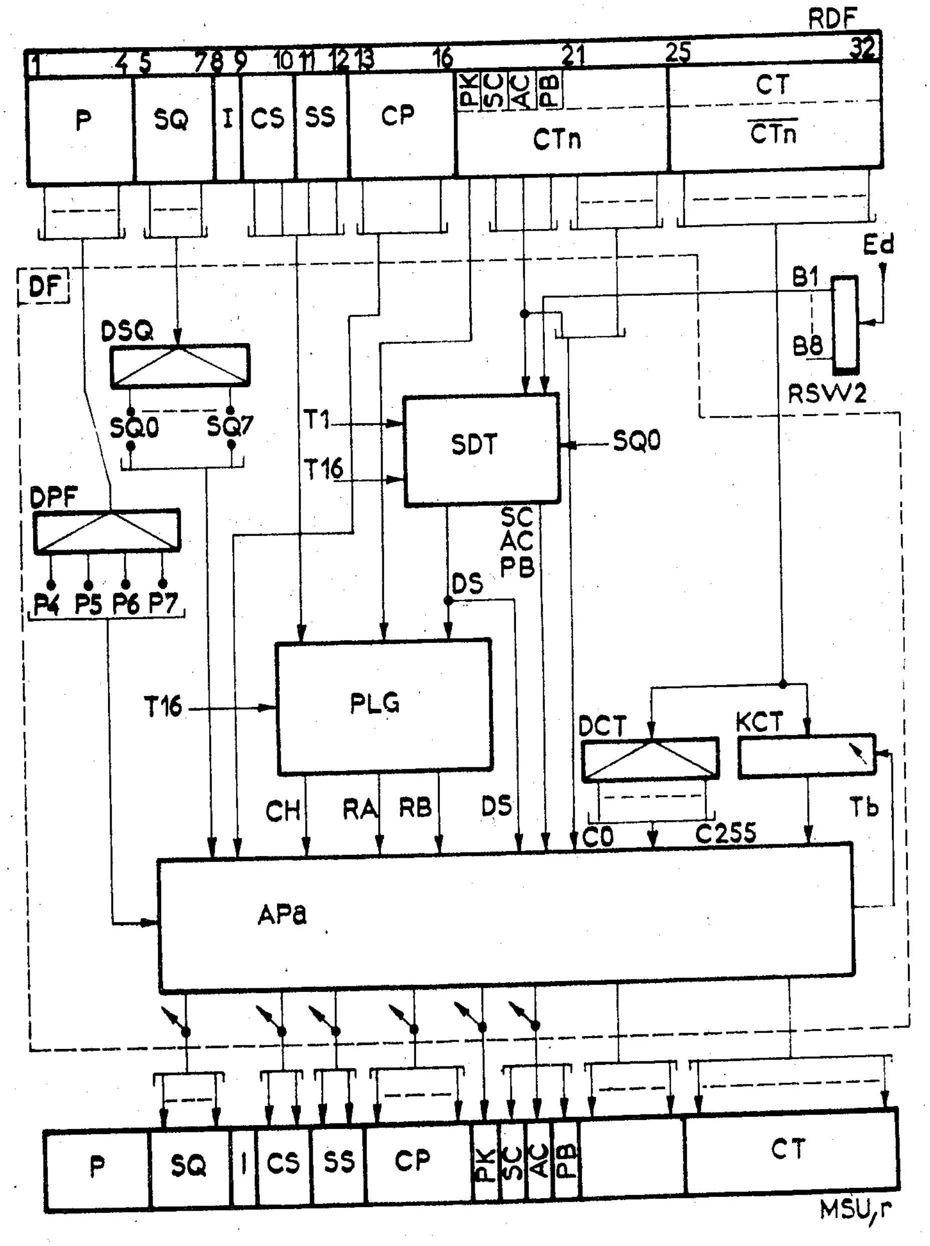
Figure 20:
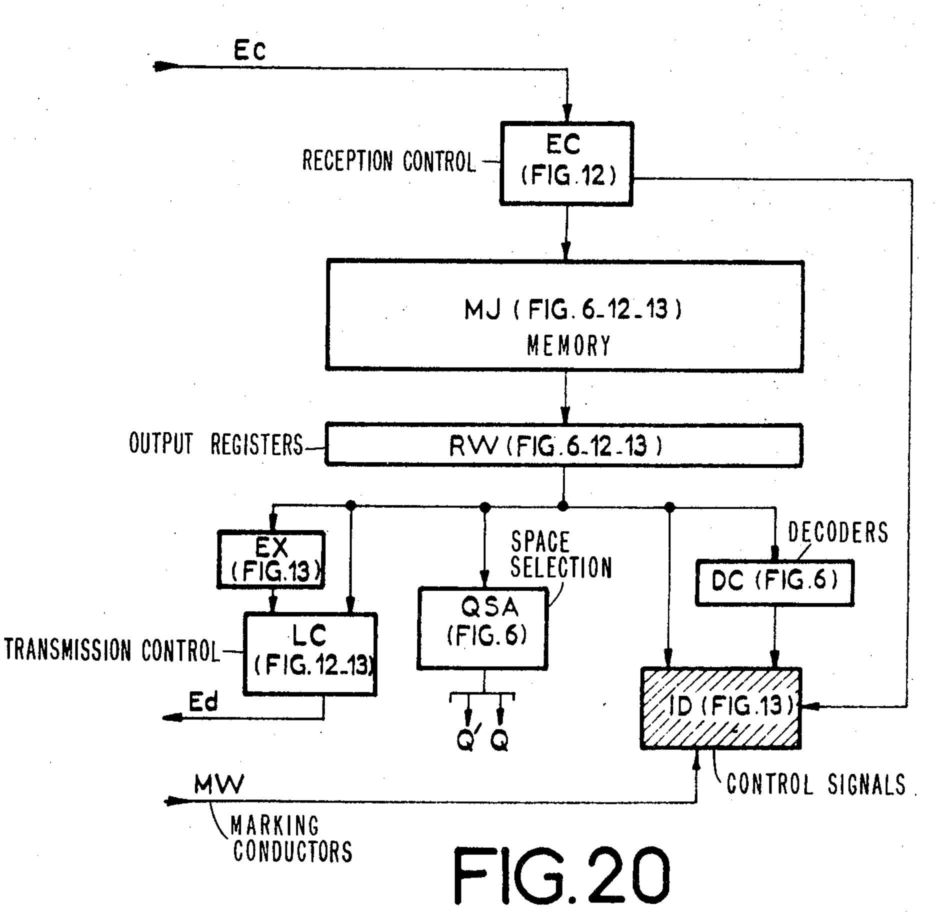
Figure 22:
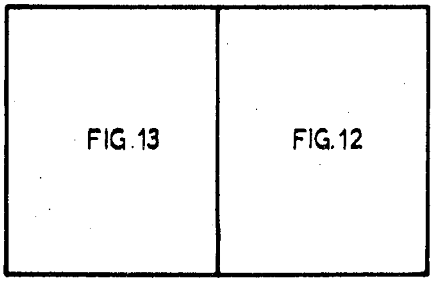
Figure 21:
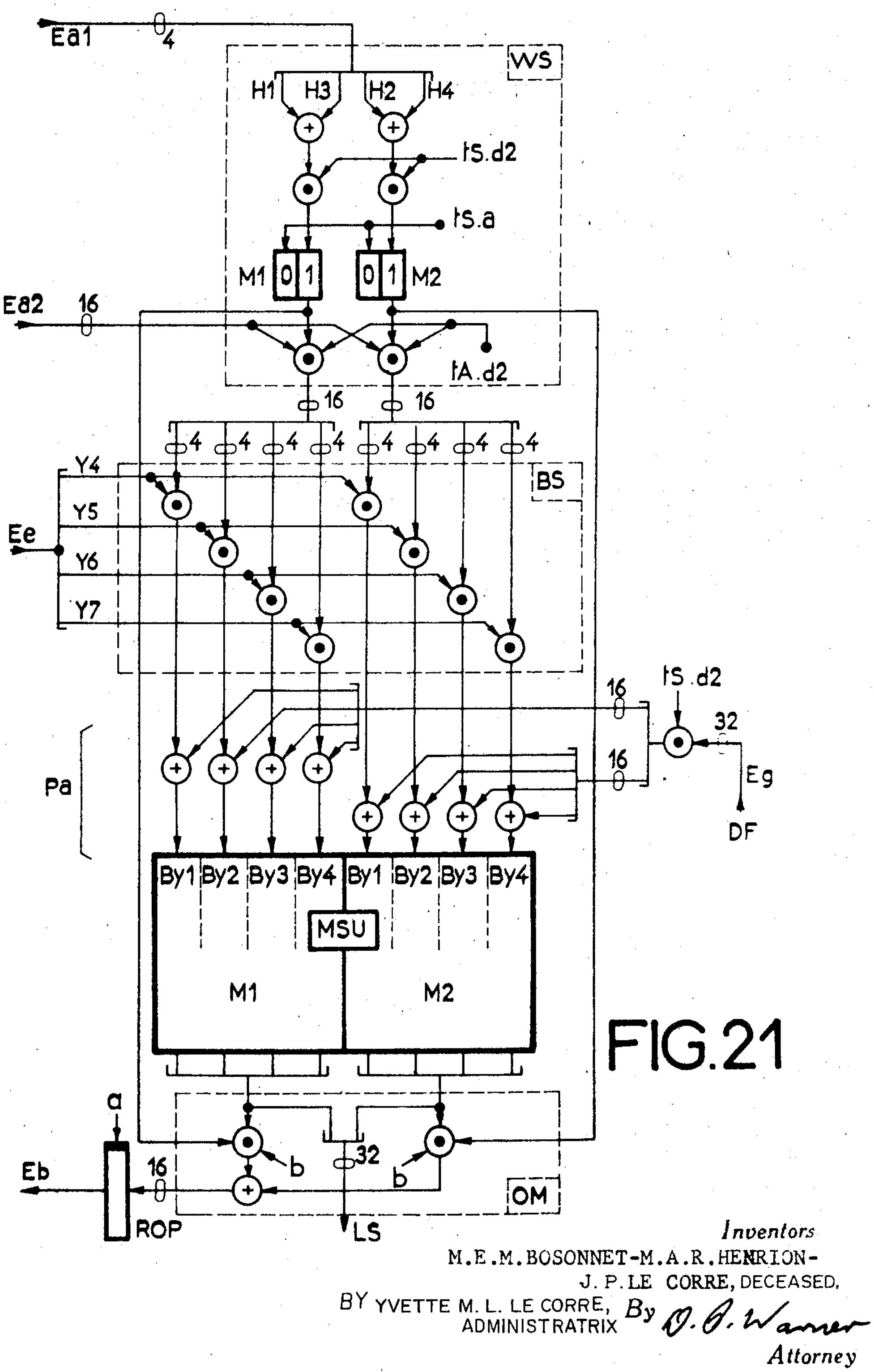

FIGS. 9.*a* to 9.*i* represent the diagrams of the signals related to the operation of the multisignaller;

FIG. 10 represents the format of the instructions P1 to P11;

FIG. 11 represents the marking circuits for the transfer units TU;

FIG. 12 represents a second part of the circuits of the junctor;

FIG. 13 represents a third part of the circuits of a junctor;

FIG. 14 represents the transmission logic circuit;

FIG. 15 represents the elements of the DF circuit used for a data transfer instruction;

FIGS. 16.*a* to 16.*c* represent diagrams of signalling signals;

FIG. 17 represents the elements of the DF circuit used for an instruction of signalling supervision;

FIG. 18.*a* to 18.*b* represent diagrams grouping the succession of operations of signalling detection;

FIG. 19 represents the instruction circuit AP4;

FIG. 20 represents the general diagram of a junctor;

FIG. 21 represents the detailed diagram of the writing circuits in the memory MSU;

FIG. 22 represents the mode of assembly FIGS. 12 and 13;

The description will be divided as follows:

1. The PCM switching network;
2. Principle of the multisignaller;
3. Description of the multisignaller;
4. The instruction directory;
5. The data transfers between a multisignaller and a junctor;
6. The data transfer instructions;
7. The signalling supervision under the control of the multisignaller;
8. The instructions for the signalling supervision;
9. Miscellaneous instructions;

1 THE PCM SWITCHING NETWORK 1.1. Characteristics of the PCM system

The main characteristics of the PCM system considered by way of an example in the present description are grouped in the table 1, the diagrams of the clock signals being given in the FIGS. 1.*a* to 1.*f*.

The shortest signal delivered by this clock, the description of which is beyond the scope of the invention, has a width of 81 ns.

TABLE 1

Characteristics of the PCM system and clock signals (exchange time base HS)

| Symbol | Unit duration | Cycle duration | | Figure |
|---|---|---|---|---|
| TR | 125 μs | | Duration of a repetition period or frame (sampling frequency:8 Kc) | 1.*a* |
| *m* | | | Number of channels on a trunk (m=24) | |
| V1, V2–V24 | ≃ 5,2 μs | 125 μs | Channel time slot | 1.*a* |
| *p* | | | Number of bits in a message and number of trunks in a group (p=8) | |
| *m*1, *m*2–*m*3 | 650 ns | 5,2 μs | Digit time slot | 1.*b* |
| *t*1–*t*96 | 1,300 ns | 125 μs | Base time slots | 1.*c* |
| C*t* | | | Set of the 96 base time codes | |
| *t*S | 650 ns | | Synchronous time slots | 1.*d* |
| *t*A | 650 ns | | Asynchronous time slots | 1.*e* |
| *t*S1–S96 | 650 ns | 125 μs | Interleaved sets of signals | |
| *t*A1–A96 | 650 ns | 125 μns | *t*S and *t*A | 1.*f* |
| *a*, *b*, *c*, *d* | 162,5 ns | 650 ns | Narrow time slot signals | 1.*f* |
| *a*1, *a*2 (*d*1, *d*2) | ≃ 81 ns | 162,5 ns | Ultra-narrow time slot signals dividing a time slot a (*d*) into two equal time slots | 1.*g* |
| C*t*.*t*S | | | Cyclical selection at synchronous (*t*S) time slots | |

The signals represented on the FIGS. 1.*d* and 1.*e* are elaborated in the following way: during a repetition period or frame, the central exchange clock supplies a series of $g/2 = 96$ codes Ct characterizing the time division of this frame. The decoding of these codes yields $g/2$ base time signals t1, t2 . . . t96. Each one of these time slots is divided into two equal parts so as to obtain the two trains of 96 interleaved signals constituting the synchronous time signals *t*S1, *t*S2... *t*S*x*... *t*S96 and the asynchronous time signals *t*A1, *t*A2 . . . *t*A*y*... *t*A96.

1.2 The circuits associated to the junctors.

The PCM Switching Center described in the Patent application referenced b comprises a switching network enabling to establish a link between a given incoming channel on a multiplex trunk and a free outgoing channel on another multiplex trunk (of on the same trunk), these incoming and outgoing channels occupying, in general, different time positions.

Each one of these trunks is the support of $m = 24$ channels (FIG. 1.a) with a serial transmission of p-bit ($p = 8$) messages. One has constituted, in this Switching Center, groups of $p = 8$ trunks N1, N2–N8, the incoming lines of which N1*e*, N8*e* are connected to an incoming circuit SCR (see FIG. 2). This circuit, which controls first the synchronization functions and second the series-parallel conversion of the messages, is described in the patent application referenced *a*. It controls thus the passage from a system of multiplex trunks each one comprising *m* channels V1, V2–V24 (see FIG. 1.*a*) on which the information is present in a serial form (each bit of a message occupies one of the digit time slots m1 to m8 of the channel time, FIG. 1.*b*) to a system of groups of trunks in supermultiplex comprising $g = p \times m = 192$ channels in which the information is present in parallel form, each of the digit time slots *m*1, *m*2–m8 being assigned to one of the trunks N1, N2–N8. On the other hand the channels V1, V2...V24 over the incoming lines N1*e*, N2*e*–N8*e* are not in synchronism, i.e. that the message, pertaining to the channel V1 for instance, may be received at any time position in the frame defined by the central exchange clock HS. The circuit SCR controls the marking of the channels in each trunk and supplies, for each of said channels, an 8-digit channel identification code C*v*.

These C*v* codes are used for controlling the writing of the messages received on the incoming lines in the data group memory MDG comprising 192 8-bit addresses, each address being assigned to one of the 192 channels of the supermultiplex.

Figure 2:
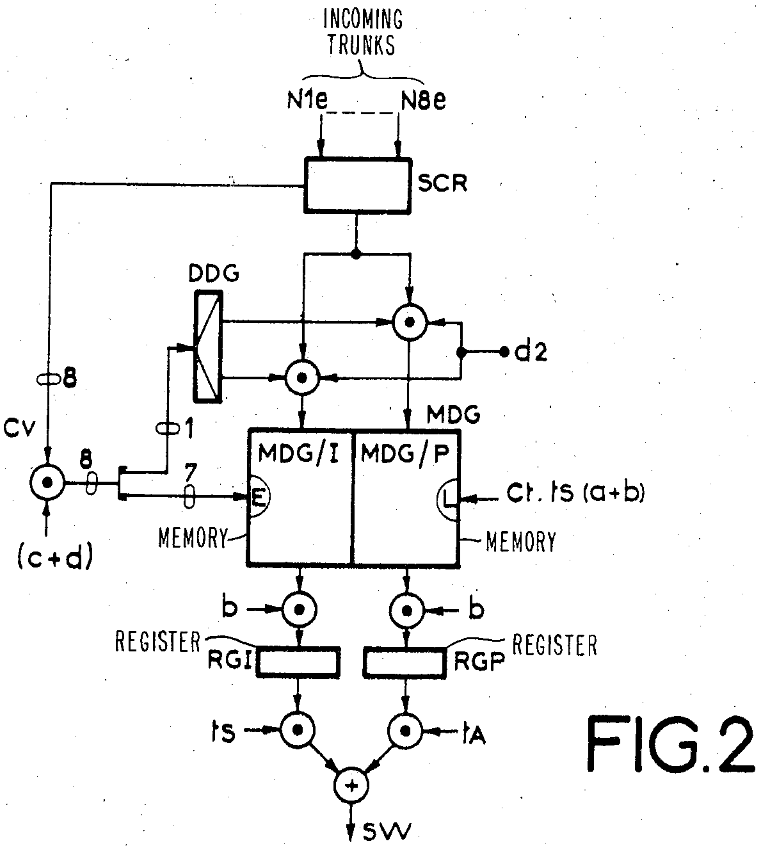
FIG. 2 represents a simplified diagram of the group data memory.

FIG. 2 represents a simplified diagram of this memory which is constituted by the association of two memories MDG/I, MDG/P comprising each $g/2 = 96$ addresses. The selection of homologuous addresses in both memories is common. These memories are respectively assigned to the incoming lines of the odd trunks (N1*e*, N3*e*, etc.) and to the incoming lines of the even trunks (N2*e*, N4*e*, etc). The address write selection is performed, at times $(c + d)$ under the control of the seven most significant digits of the code Cv (inlet "E" of the memory), the last digit of said code controlling the choice between MDG/I and MDG/P.

In a mode of operation of the switching center, the trunks are specialized according to the direction of the call, the odd trunks being specialized as calling trunks connected to a junctor at a time tS and the even trunks being specialized as called trunks connected to a junctor at a time tA.

The selection of the memory MDG for the readout is carried out in a synchronous mode under the control of the clock signals C*t*.*t*S. $(a + b)$ applied at the inlet "L". The messages read are transferred, at the narrow times in the registers RGI and RGP and they are transmitted to the switching network, respectively, in tS and in tA.

1.3. Description of the switching network

A connection between a channel G1:*t*A*y* (even channel *y* of the group G2) is carried out, through the switching network SW, by means of a junctor SJ8.5 (junctor J5 of the superjunctor SJ.8). This connection requires the setting up, at each frame, of two half-connections:

- a half-connection of type S*w* (synchronous half-connection) which will be designated by G1:*t*S*x*/SJ8.5,
- a half-connection of type A*w* (asynchronous half-connection) which will be designated by SJ8.5/G2:*ty*.

FIG. 3 is an "unfolded" diagram which represents, in a simplified way, the circuits used by this connection G1:*t*S*x*/SJ8.5/G2:*t*A*y*. At the center of the figure, one has shown the circuits of the junctor J5 which is common to the two half-connections. On the left and on the right of this junctor, one has shown the circuits used respectively for the half-connections Sw and Aw.

Thus the circuit QS (QA) represents, in plain lines, the space path of the half-connection Sw (Aw) and it is realized that, in practice, these two paths are established by means of the same space switching network.

The circuits represented on FIG. 3 are:

- The input circuits SCR1, SCR2 associated to the groups G1 and G2,
- The group data memories MDG1/I (of the group G1) and MDG2/P (of the group G2) which are the only ones concerned by this connection,
- The group demultiplexers DXG1/I, DXG2/P which carry out the parallel-series conversion of the messages to be transmitted over the odd (N1*s*, N3*s* etc.) and even (N2*s*, N4*s* etc.) outgoing channels,
- the junctor J5 of which have been only shown the time path memory MCT controlling the time switching and the junctor data memory MDJ controlling the arrangement of the time positions of the two half-connections. These memories comprise each one *g*/2 lines with a common address selection which is carried out either in a synchronous way at times *t*S under the control of the signals C*t*.*t*S or in a asynchronous way (random selection) at times *t*A under the control of codes read at times tS in the memory MCT and delayed in the register RW1S,
- The circuit QS (QA) grouping the cross-points Q*a*, Q*b*, (Q*c*, Q*d*) used in the space switching network for the half-connection S*w* (A*w*). This switching network is achieved by the association of several switches grouped in one or several selection stages.

Figure 4:
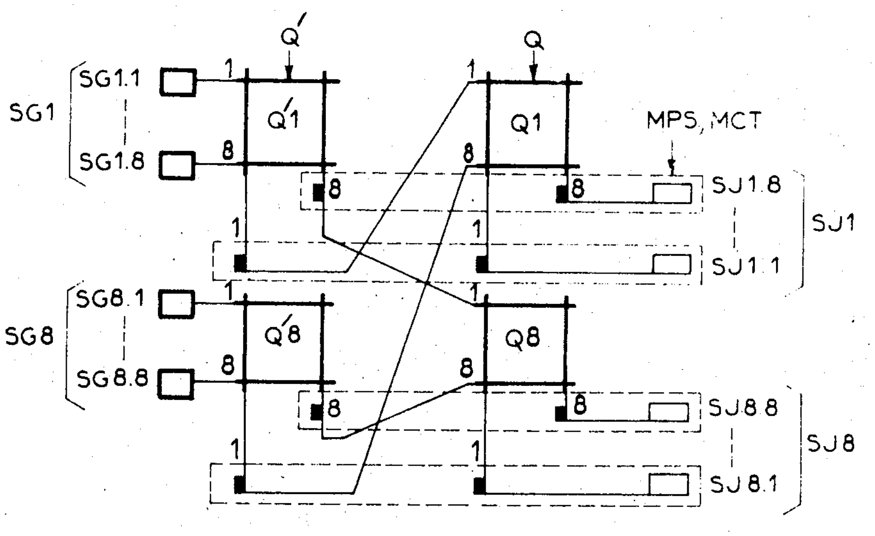
FIG. 4 represents the switching network.

FIG. 4 represents, by way of example, the network SW described in the patent application referenced b and which comprises two selection stages Q, Q′ comprising each eight identical switches.

Each of these switches comprises, by way of example, $h = 8$ rows and $v = 8$ columns and the selection of one of the 8 cross-points located on one column is carried out under the control of a code delivered by a space path memory associated to this column.

This memory is of the non-destructive readout type and the clearing or the modification of the contents of one address is carried out by a positive control using two wires per bit.

Each input of a switch of the stage Q′ is connected to the output of a group data memory, the whole assembly of eight groups associated with a switch constituting a supergroup. Each output of a switch of the stage Q is connected to a junctor, the whole assembly of the eight junctors associated with a switch constituting a superjunctor.

In order to set up the half-connection Sw it is seen that it is necessary to control in tSx the opening of one cross-point in each of the switches Q′1 and Q8. In the same way, for setting up the half-connection A*w*, it is necessary to control in tAy the opening of one cross-point in each one of the switches Q′2 and Q8. It results therefrom that two space path memories are associated with each column of the switch, i.e. a synchronous space path memory MSS′ (in the stage Q′) or MSS (in the stage Q) and an asynchronous space path memory MSA′ or MSA.

Figure 5:
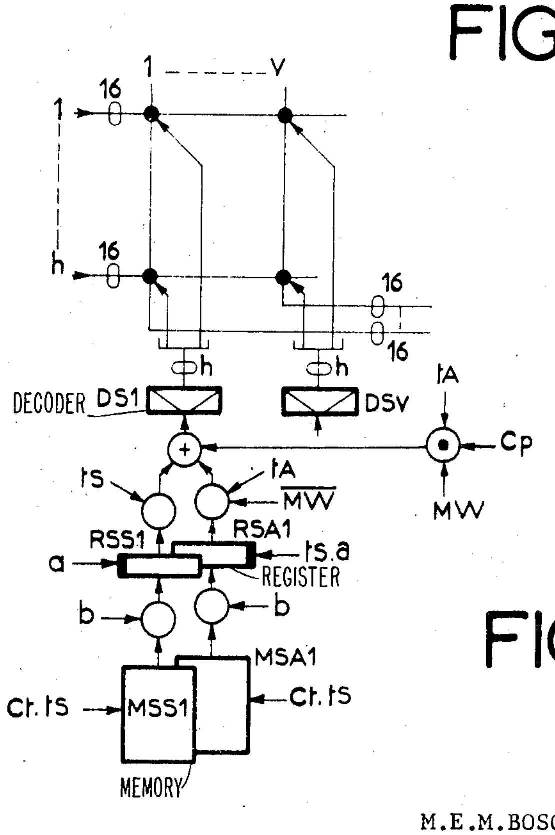
FIG. 5 represents a multiselector of the network SW.

FIG. 5 represents one of these switches with its access circuits. Each input and each output is constituted by a group of $2p = 16$ conductors for the bidirectional transfer, in parallel form, of 8-bit messages. At each cross-point between an input and an output, there are 16 AND circuits constituting a multiple gate symbolized by one point. Each of the $h$ gates associated to a given output, the output 1 for instance, is controlled by one of the $h$ signals delivered by the decoder DS1. The codes applied to this decoder are supplied either by the memory MSS1 (selection code for one half-connection Sw) or by the memory MSA1 (selection code for one half-connection Aw).

In the same way as in the group data memories, the readout is performed cyclically under the control of the signals $Ct.tS$, the code delivered by MSS1 being applied to the decoder DS1 at the synchronous time $tS$ and that supplied by MSA1 being applied to said decoder at the asynchronous time $tA1$.

The space selection may also be carried out without using a code delivered by a space path memory.

Thus, a marking signal MW appearing during the times $tSm + tAm$ controls the application to the decoder DS1, in tAm, of the code Cp identifying the row $p$ to be selected and blocks the output of the register RSA1.

It will be noted that in order to simplify the FIG. 2, one has only shown the gates which correspond to a single selection stage and that one has not shown the space path memories.

1.4. Extension unit

Referring to FIG. 4, one will note that the memories MSS and MSA associated to each column of a switch are symbolized by a rectangle located at the lower part of the column. It is also seen on this figure that the memories associated to the homologous columns of the switches of same index $n$ in the stages Q and Q′ are grouped with the memories MCT and MDJ of the junctor Jn in order to constitute an extension unit.

FIG. 20 represents the whole assembly of the circuits located in a junctor with, between brackets, the references of figures representing the detailed diagrams.

A junctor comprises:

1. the memory MJ and its block of output registers RW,
2. the peripheral circuits which are associated to it, which are:
   The circuits EC and LC controlling the reception and the sending of information to the switching network SW as well as the circuit EX,
   The circuit QSA which controls the space selection in the stages Q′ and Q,
3. The circuit ID which elaborates the control signals used in the circuits EC and LC. The input signals of this circuit ID are supplied:
   by the registers RW and the block of decoders DC,
   by the circuit EC,
   on the group of marking conductors MW connecting the junctor to one or several multisignallers.

Figure 6:
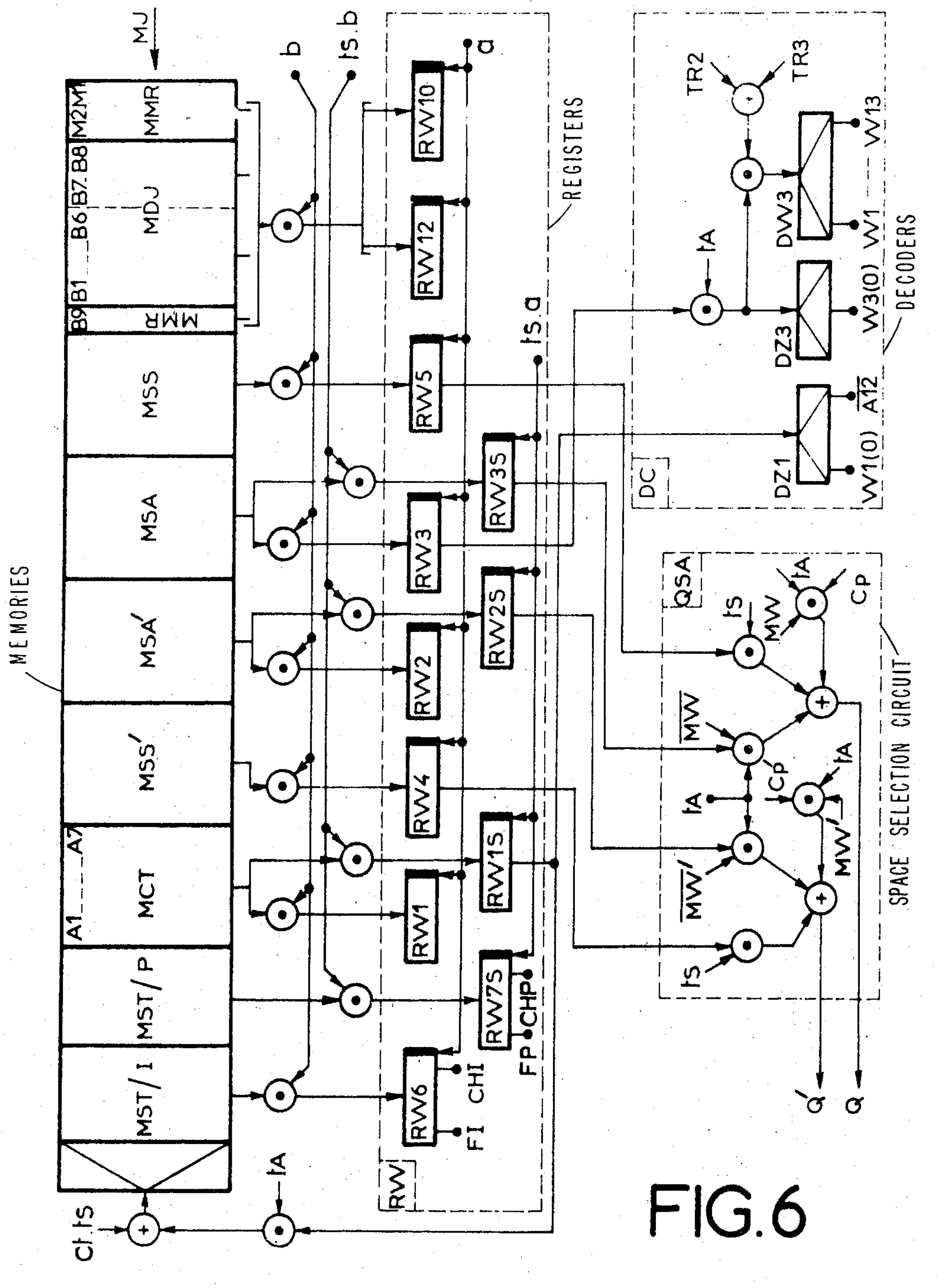
FIG. 6 represents a first part of the junctor circuits.

FIG. 6 represents the detail of the block of memories MJ which comprises $g/2$ addresses, the block of registers RW as well as the peripheral circuits QSA and DC.

The block of memories is divided into nine words W1 to W7, W10 and W12 which may be addressed separately. One distinguishes, for the junctor SJ1.1:

The memory MDJ comprising the bits B1 to B8 distributed over the words W10 and W12, the memory MCT comprising the bits A1 to A7 (word W1), The memories MSA′ and MSS′ associated to the vertical 1 of the multiselector Q′1 (words W2 and W4), The memories MSA and MSS associated to the vertical 1 of the multiselector Q1 (words W3 and W5), The signalling memories MST/I, MST/P (words W6 and W7) associated respectively to the memories MDG/I, MDG/P of the group of trunks SG1.1, The marking memory MMR (word W10) and the bit B9 of the word W12 the utilization of which will be described in the paragraphs 5.3 and 6.1.

The utilization of the data and path memories has been described hereabove.

The signalling memories MST/I and MST/P are provided for storing the information concerning the signalling state over each channel. These states are:

Free channel (information FI, FP) or busy channel ($\overline{FI}$, $\overline{FP}$)

Change of signalling state (information CHI or CHP).

The mode of connection of these memories, of collection of the informations and of their processing has been described in the patent application referenced $c$.

The memories of the block MJ are read in a synchronous way at each time tS and, eventually, asynchronously (random selection) at times $tA$ under the control of the codes Ct read in MCT. The information read is transferred in the registers of the block RW which may be grouped in two units as shown in table 2.

The registers of the first group, in which the information is transferred in $tS.b$ and is cleared in $tS.a$, enable to use these latter during a whole base time ($tS + tA$). The registers of the second group, in which the information is transferred in b and cleared in a, enable to use these latter during the same time, $tS$ or $tA$, where they have been read.

TABLE 2.—GROUPING OF THE REGISTERS OF THE BLOCK RW

| Time: Readout | Time: Use | MST/I | MST/P | MCT | MSS′ | MSA′ | MSA | MSS | MSI MDJ MMR | Memories ← |
|---|---|---|---|---|---|---|---|---|---|---|
| tS | tS et tA | ---------- | RW7S | RWIS | ---------- | RW2S | RW3S | ---------- | ---------- | Registers |
| tS<br>tA | tS<br>tA | RW6 | ---------- | RWI | RW4 | RW2 | RW3 | RW5 | RW10<br>AW12 | |

The block of the decoders DC comprises:

The decoders DZ1 and DZ3 associated to the registers RW1S and RW3 which deliver the signals W1 (0) and W3 (0), when a zero code characterizing an free address is read. Besides the decoder DZ1 delivers a signal $\overline{A12} = \overline{A1 + A2}$.

The decoder DW3 associated to the register RW3 delivering, for the logic condition TR2 + TR3, a word selection signal W1, W2 etc. when the corresponding code is stored in the address read by an asynchronous selection (time tA). The signals TR2 and TR3 characterizing a transfer unit operation will be defined in the paragraph 6.

The space selection circuit QSA, controls the transmission of the codes read in the space path memories towards the decoders, such as DS1 (FIG. 5), associated to the columns of the switches. The codes are supplied by the registers RW3S, RW5, RW2S and RW4.

The marking signals MW (for the stage Q) and MW' (for the stage Q') block the utilization of the codes supplied by these memories and enable the selection by a predetermined code Cp or Cp' (see also FIG. 5). These signals are used, in the same way as the signals TR1 and TR2, in transfer unit operation.

One will note that the signal $\overline{A12}$ supplied by the decoder DZ1 characterizes a code of time Ct used in a half-connection Aw. In fact the time codes stored in the memory MCT comprise seven bits enabling 128 combinations. In order to select $g/2 = 96$ addresses, one uses only the 96 combinations wherein the two most significant bits A1 and A2 are different from zero so that the signal $\overline{A12}$ characterizes an address assigned to an asynchronous half-connection Aw. The other circuits of the junctor are represented on FIGS. 12 and 13 and are described in paragraph 5.3.

1.5. Setting up of connection

As it has been seen previously, each one of the half-connections Sw and Aw requires the performance, at each frame, of a space switching and of a time switching which will be described separately in referring of FIG. 3 in which the space switching (circuits QS, QA) uses only one selection stage.

1.5.1 - Space switching :

At each time $tSx$ (or $tAy$), a bidirectional cross point must be activated under the control of the code stored in the address $x$ (or $y$) of a space path memory. For the half-connection Sw, the selection code of the point $Qa$–$Qb$ is read in tSx in a memory MSS and selects, during the whole duration of this time, the point $Qa$–$Qb$. For the half-connection A$w$, the code read in $t$Sy in a memory MSA selects, during the whole duration of the following time tAy, the point $Qc$–$Qd$.

1.5.2 Time switching

During all the time $tSx$, the addresses $x$ of the memories MDG1/I and MDJ are selected thus characterizing the setting up of the half-connection G1:$tx$/SJ2.5. At the narrow time $b$, the content of the address $x$ of MDJ is read and transferred to the demultiplexer DXG1/I. The content of the address $x$ of DMG1/I is then read and it is transferred, at the narrow time $d2$, in the same address of MDJ.

At the same time $tSy$, the content of the address $y$ of MCT is also read and transferred in the register RCT, this information being the code Cx enabling the selection of the address $x$ in the block of memories of FIG. 4. At the time $tAy$, this code C$x$ controls the selection of the address $x$ of the memory MDJ and the signal C$t$.$t$A controls the selection of the line $y$ of the memory MDG2/P. The transfer of messages between MDG2/P and SJ2.5 and between SJ2.5 and DXG2/P is then carried out then as described in the above paragraph.

It is thus seen that a given message stored in the address $x$ of MDG1/I is transferred in the address $x$ of MDJ in $tSx.d2$ and that it is transferred to the demultiplexer DXG2/P in $tAy.b$, the delay of this transfer being shorter than a frame period.

2 - PRINCIPLE OF THE MULTISIGNALLER

One has described, in the above paragraph, the group data memory MDG which is used as a buffer between the incoming channels and the switching network SW and wherein the messages are written in $(c + d)$ of each time $t$S or tA and are read in $(a + b)$ of each time $t$S (see FIG. 2).

In the present invention, one replaces certain groups of trunks and the associated data memories by multisignallers SU which play a role of buffer registers between the switching computer CP and several units of the switching center, the control information being transmitted to said units under the form of codes through the network SW in the same way as if one has to deal with messages.

Figure 7:
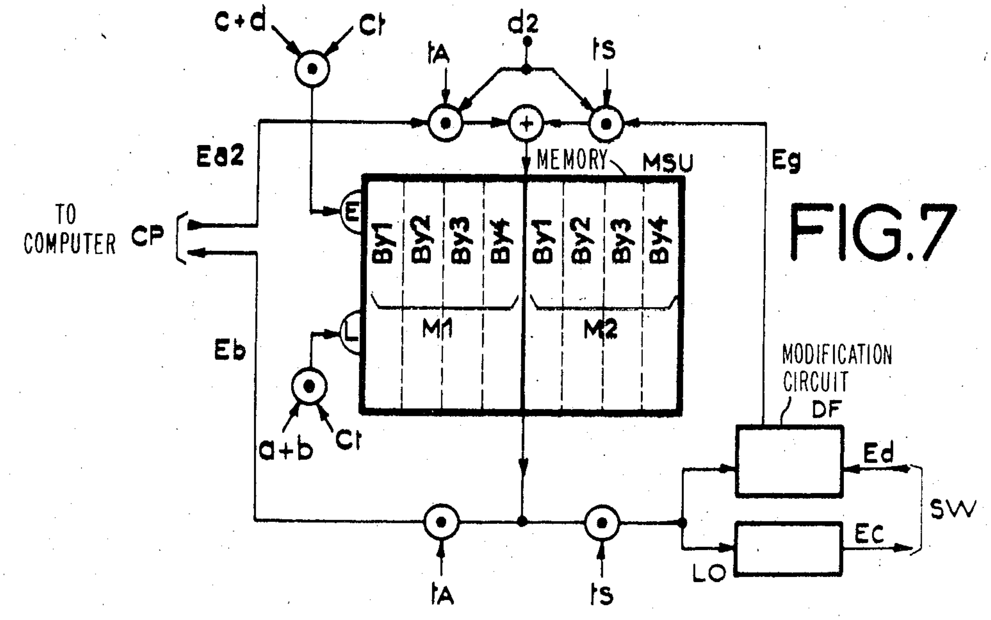
FIG. 7 represents the diagram of the memory MSU of the multisignaller.

The group data memory is thus replaced by a multisignaller memory MSU which is of the NDRO type. FIG. 7 represents a very simplified diagram of this memory MSU and of its control circuits.

In this memory the times $t$A are reserved to write and read operations concerning data exchanges with the computer CP and the times $t$S are reserved to operations concerning data exchanges with the network SW (through the circuit LO) or with the logical circuit LR which modifies this data before writing it again at the same address.

The read and write selections are carried out respectively at times $(a + b)$ and $(c + d)$. The selection codes Ct are supplied by the clock (synchronous selection) for the exchanges with the network SW or by the computer CP (asynchronous selection) for the exchanges with this unit.

It will be noted that the information applied to the circuit DF is compared to that received from the network SW over the bus Ed and that the result of this operation, transmitted on the bus E$g$, constitutes the new information to be stored in the memory MSU.

Each address of the memory MSU or signaller has a 32-bit capacity among which:

- the bits 1–4 (symbol for bits 1 to 4) are assigned for the storage of an instruction code,
- the bits 5–7 are assigned, partly or totally, to the storage of a code SQO, SQ1 etc. identifying the different microphases in an instruction.
- the bit 8 is assigned to the storage of an information I or $\overline{I}$, the information I meaning that the signaller may call the computer CP when the operations concerning the instruction in course are completed.

Figure 8:
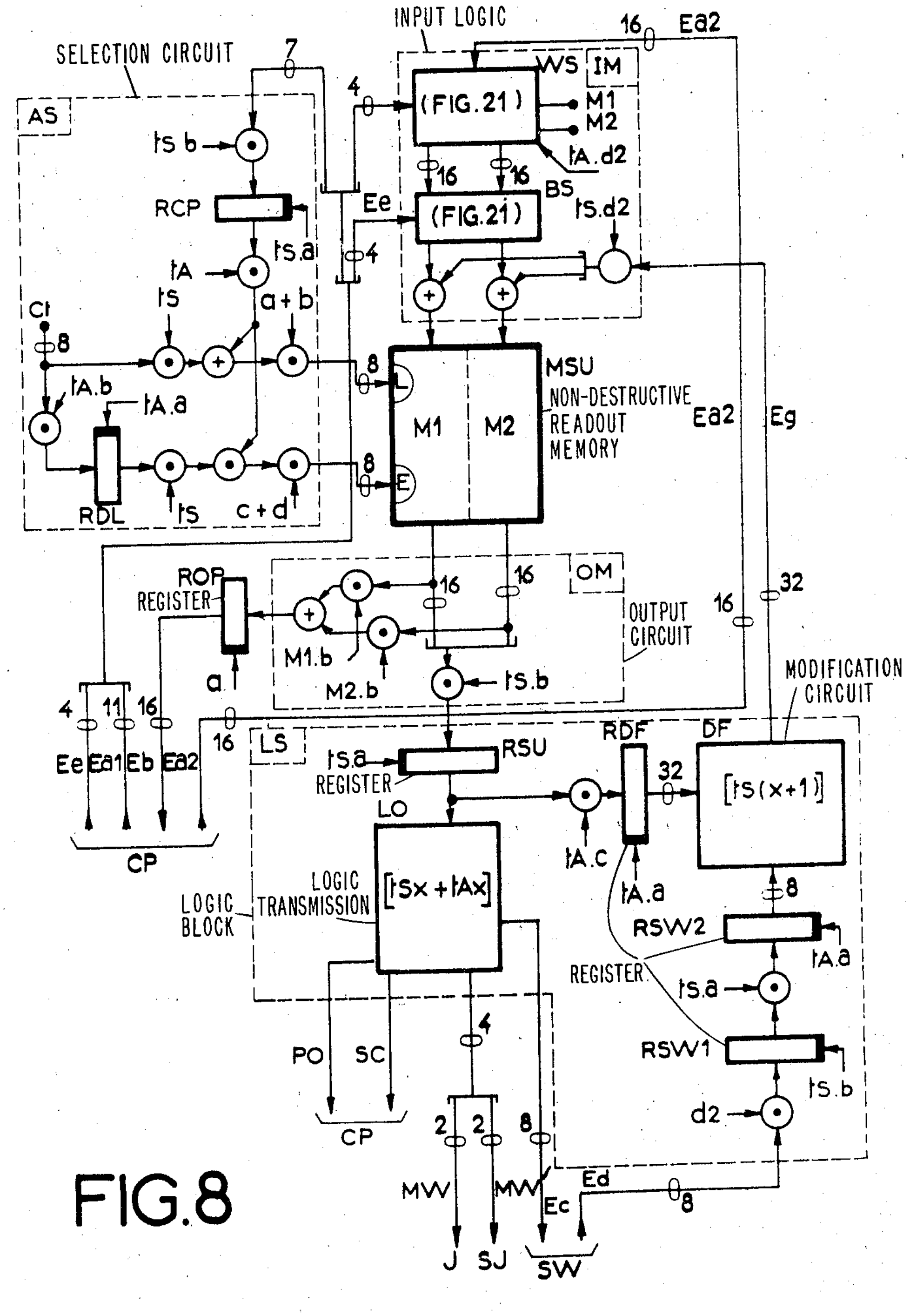
FIG. 8 represents the detailed diagram of the multisignaller.

This FIG. 7 is very simplified and, actually, the computer CP sends, over the group of conductors E$a$2, 16-bit words which must be directed, as it will be seen during the description of FIG. 8, towards one of the two parts M1 or M2 of the memory MS0.

The format of this memory is thus a 32-digit double word addressable in two distinct 16-digit words M1, M2. Besides, the computer sends data write orders concerning 4-digit bytes reference By1–By4 so that one word intended to the part M1, for instance, modifies only the content of the byte By1, if it is accompanied by a write order identifying this byte.

3. DESCRIPTION OF THE MULTISIGNALIZER 3.1. General description.

FIG. 8 represents the detailed diagram of a multisignaller which comprises:

The non-destructive readout memory MSU,

The selection circuit AS which delivers the read and write address selection signals for this memory, The output circuit OM of the memory which sends information read in the memory either to the computer CP or to the logical block LS, The logical block LS which comprises first the logical transmission circuit LO transmitting informations read in the memory towards the computer CP or towards the network SW and second the modification circuit DF which compares the information read in the signaller *x* to those received from the network SW and intended for this signaller. One elaborates then the modified information which is stored in the address *x* of the memory (transmission over the bus Eg), the input logical circuit IM of the memory which controls the writing of information supplied either by the computer CP or by the circuit DF.

In order to describe the operation of a multisignaller one will study separately the address selection, the control of the reading and of the writing of informations in the signallers and the processing of said informations in the logical block LS.

In each one of the two first operations, one will describe successively:

The bidirectional transfers between the memory MSU and the network SW which will be symbolized by the expression "(MSU)$Tf^2$(SW)" (see table 3).

The operations of same type concerning MSU and CP which will be symbolized as "(MSU)$Tf^2$(CP)".

3.2. The address selection:

(FIGS. 8 and 9.*a* to 9.*i*)

a. Operations (MSU)$Tf^2$(SW) : The read and write selections concerning an address *x* are performed at times *t*S but they are separated by one base time. The description of these operations refers to several diagrams of FIGS. 9.*a* to 9.*i* which cover two successive base time slots *t*S*x*, *t*A*x*, *t*S(*x* + 1) and tA(*x* + 1). The table 3 here after gives the meaning of the different symbols used in these diagrams.

FIG. 9.*a* shows the application time of the code C*tx*. In *t*S(*a* + *b*), the signaller is read (FIG. 9.*b*) and, in most of the cases, the content of this address is applied to the circuit DF (FIGS. 7 and 8) in order to be modified according to the information received from the network SW. It will be seen, during the description of the circuit DF that the result of this modification is available in *t*S(*x* + 1) and, as it must be written in the signaller *x*, the code C*tx* must still be available at this time.

The required delay is obtained by transferring this code in *t*A*x*.*b* in the register RDL previously cleared in tAx.a (FIG. 9.b). The write selection of the signaller *x* is thus carried out in *t*S( ). (+ 1). (*c* + *d*) (FIG. 9.*i*).

b. Operations (MSU)$Tf^2$(CP): For these operations, the selection code for the signaller is, in all cases, supplied by the computer over 7 of the 11 conductors of the bus Ea1. This code is sent by the computer in *t*S*x* and is stored in the register RCP which delays it up to *t*A*x*. At this time, the read selection is carried out at (*a* + *b*) and the write selection at times (*c* + *d*).

3.3. The read and write control in memory MSU (FIGS. 8 and 21)

a. Operations (MSU)$Tf^2$(SW): At each time *t*S.*b*, the double word read in memory MSU is transmitted, by means of the circuit OM and of the register RSU, to the logical transmission circuit LO and to the modification circuit DF, both these circuits being described in paragraph 3.4. For the write operation, the double word delivered by the circuit DF over the bus Eg is stored in the memory in *t*S.*d*2.

TABLE 3

Symbols used in FIGS. 9.*a* to 9.*i* and in tables 7 to 19

| Symbol | Meaning |
|---|---|
| C*tx* | Code of the base time *tx* |
| MSU,*x* — W3,*m* | Address *x* of MSU — Address *m* of MSA (word W3) |
| CW3 | Selection code for word W3 |
| SEQAV | Advance conditions of sequential control |
| CTAV | Advance conditions of the delay counter CT |
| Z | Clearing |
| S*t* | Command for setting in the 1 state |
| T*f* | One-way transfer |
| $Tf^2$ | Bidirectionnal transfer |
| Comp | Comparison |
| (9–12), (W3,*m*) | Content of bits 9 to 12 of the signaller (content of the address W3,*m* ) |
| [ E*d* ] | Data received or transmitted/on bus E*d* |
| CW4(9–12) | The content of bits 9–12 is the code CW4 |
| $\overline{(21–24)}$ | Complement of the number stored in bits 21–24 |
| (17–24)Tf(9–16) | Transfer of the content of bits 17–24 in bits 9–16 |
| (9–16)Tf[ E*c* ] | The content of bits 9–16 is transmitted to the network SW over the bus E*c* |
| [ E*d* ]Tf(17–24) | The data received on the bus Ed is transferred in bits 17–24 |
| DS → (9–10) | Transfer of the information DS in bits 9–10 |
| CW4 → (W3,*m*) | Transfer of code CW4 in the address m of word W3 |
| +1(13–16) | Add one unit to the number stored in bits 13–16 |
| CJ5 = >J5 | The decoding of the code CJ5 gives a signal J5 |
| B1 ≡ PB | The informations B1 and PB are identical |
| B1 ≠ PB | The informations B1 and PB are different |
| "." | AND logical function |
| "+" | OR logical function |
| " → " | Characterizing a command for one or several flip-flops |

b. Operations (MSU)$Tf^2$(CP): We have seen that the read and write operations in memory MSU are carried out in *t*A for this type of operations. Nevertheless we have seen, in the paragraph 2, that, due to the difference in formats between the memory and the bus E*a*2, it was necessary to address separately the words M1 and M2.

This word addressing information is supplied, at the preceding time tS, over four of the conductors of the bus Ea1 and the selection of the word is carried out in the circuit WS located in the input logical circuit IM.

Besides, the byte selection orders of By1–By4 are supplied at time tA over the bus Ee, the operation being carried out in the circuit BS which is also located in the circuit IM.

FIG. 21 represents the detailed diagram of these circuits WS and BS.

The word selection circuit WS comprises the flip-flops M1 and M2 controlled by the informations received over the bus Ea1. When the computer CP wants to carry out a transfer with the memory MSU, this latter receives a signal over one of the conductors H1 to H4 at the time $t$S preceding the time $t$A of the transfer. One has thus:

$$(H1 + H3).tS.d2 \rightarrow M1$$

$$(H2 + H4).tS.d2 \rightarrow M2$$

$$tS.a \rightarrow \overline{M1}, \overline{M2}.$$

The flipflop M1 or M2 remains in the state 1 during the whole duration of the following time $t$A reserved to the transfers.

If for instance, one has the logical condition M1, the information read at time $b$ in the part M1 of MSU is transferred in the register ROP in order to be transmitted to the computer CP over the bus Eb (see circuit OM, FIGS. 8 and 21) and the information which may be received over the bus Ea2 is sent to the part M1 of MSU in $t$A.$d$2.

The byte selection circuit BS to which are connected the two groups of 16 conductors coming from the circuit WS comprises, for each of these groups, four multiple gates controlling each one the transfer of data concerning a byte to the corresponding part of the memory MSU. These gates are controlled by the signals Y4–Y7 supplied over the group of conductors Ee and, if — for example — the code constituted by these signals is 0110, the writing concerns only the bytes By2 and By3.

3.4 -Data processing in the logical block LS (FIGS. 8 and 9.$a$ to 9$i$).

The content of the signaller $x$, read in $t$S$x$ by the synchronous selection of the memory, is stored, at time $t$S$x$.$b$, in the register RSU just cleared at time $a$. It is thus seen that the content of the address MSU, $x$ is transferred in the register during a base time ($t$S$x$ + $t$A$x$) and it will be said later on that said register stores data in "real time".

This data is applied to the transmission logical circuit LO which may transmit a fraction thereof in real time towards the switch SW over the group of conductors E$c$. Since the data is available in $t$S$x$ + $t$A$x$, the half-connection set up with the signaller $x$ may be of the type S$w$ or A$w$.

The circuit LO delivers also, in real time, the informations PO, SC,MW, MW' the utilization of which will be defined later on.

The content of RSU, is transferred on the other hand to the register RDF at time tAx.c and remains therein up to the time $t$A($x$ + 1).a (FIG. 9.$d$) so that this information is applied to the circuit of modification DF in "-delayed time" (delay of a base time slot) and that it occupies in particular the time slot $t$S($x$ + 1).

On the other hand, the information received from the network SW, either in tSx for the half-connection S$w$ or in $t$A$x$ for the half-connection A$w$, is stored at time d2 in the register RSW1 (FIGS. 9.e and 9.f). This register being cleared at time $t$S.$b$ and its content being transferred in RSW2 at time $t$S.$a$ (FIG. 9.$g$), it is seen that its content is also applied to the circuit DF in "-delayed time". The register RSW2 is cleared at time $t$A.$a$ and it is seen, by comparing the FIGS. 9.$d$ and 9.$g$ that the information written in RDF and RSW at the times $b$, $c$ and $d$ of $t$S($x$ + 1) concerns the signaller $x$.

The modification operations are performed in the circuit DF during the times b and c and the writing of the result in the signaller $x$ occurs at time d2 (FIG. 9.$i$, circuit IM).

The circuits LO and DF will be described in detail in the paragraph 6.3.

4. INSTRUCTION DIRECTORY

The various telephone functions mentioned in the preamble may all be carried out through multisignallers SU under the control of "active" instructions supplied by the computer CP.

Each one of these instructions controls a series of elementary operations or microphases, identified by sequential codes and each function requires a succession of several instructions grouped in a sub-routine supplied by the computer CP the description of which is beyond the scope of the invention.

By way of a non-limitative example one will study the directory of instructions for a tandem telephone exchange inserted in a network using step-by-step numbering and wherein the channel signalling information is transmitted over the channel.

Table 4 hereunder groups these instructions according to the elementary functions which they control (column 1). It indicates also, for each of these functions, the informations supplied by the signaller (column 3) and those received through the switching network SW (column 4). Column 5 indicates the functions for which these informations are compared in the circuit DF of FIG. 8 and the column 6 the paragraphs in which their execution is described.

These elementary functions are:

- path check which enables to check the correct setting up of a connection,
- the digit sending which enables, in the step-by-step exchange taken by way of an example, the transmission of three decimal digits (in binary-decimal code) for carrying out a remote selection,
- the supervision of the incoming signalling (function X2) which enables to measure the signalling level and to control the digit reception,
- the data transfer (function X1) which consists in bidirectional exchanges of data between a signaller and a junctor. The operations carried out are data collections, data modifications and checks on data which have just been modified.

FIG. 10 represents the arrangement of the signaller for each of the "active" instructions mentioned in the column "2" of table 4.

On this figure :

- the codes between brackets (SQ1, SQ3 etc.) are the codes delivered by the sequantial control circuit which characterize the end of operation,
- the information between brackets are the results received through the network SW.

The instruction directory comprises, also the "inactive" instructions PO, P3, P8 which are stored as the other instructions, in the positions 1 to 4 of a signaller. Their functions are:

1. Instruction P0: Characterizes a free signaller;

2. Instruction P3 : Characterizes a signaller reserved for the processing of a call and which is not used, at this time, by an active instruction;
3. Instruction P8: Characterizes a signaller assigned permanently to functions of the type X1 and which is free.

In order to describe, in the paragraphs 5 to 9, the execution of the instructions shown on FIG. 10, it will assumed that the computer CP commands first the connection of the signaller MSU, x to the unit with which said signaller must exchange data and second the transmission to said signaller of the code characterizing the instruction and of the initial data.

TABLE 4

Elementary functions

| Functions | Active Instructions | From MSU,$x$ registers RSU, RML | From network SW registers RSW2 | Comparison in LR | Paragraph |
|---|---|---|---|---|---|
| Path check | P1 | verification code | verification code | $x$ | 9.2 |
| Digit sending | P2 | Digits | | | 9.1 |
| X2:supervision of incoming signalling | P4, P5 P6, P7 | signalling previous state information | signalling bits | $x$ | 7 and 8 |
| W1:data transfer | P8, P9 P11 | New data | data to check collected data | $x$ | 5 and 6 |
| 1 | 2 | 3 | 4 | 5 | 6 |

TABLE 5

| Bit → | 1 | 2 | 3 | 4 |
|---|---|---|---|---|
| PO | 0 | 0 | 0 | 0 |
| P1 | 0 | 0 | 0 | 1 |
| P2 | 0 | 0 | 1 | 0 |
| P3 | 0 | 0 | 1 | 1 |
| P4 | 0 | 1 | 0 | 0 |
| P5 | 0 | 1 | 0 | 1 |
| P6 | 0 | 1 | 1 | 0 |
| P7 | 0 | 1 | 1 | 1 |
| P8 | 1 | 0 | 0 | 0 |
| P9 | 1 | 0 | 0 | 1 |
| P11 | 1 | 0 | 1 | 1 |
| Signal when the bit has a value 1 | L1 | L2 | L3 | L4 |

TABLE 6

| Bit → | 5 | 6 | 7 |
|---|---|---|---|
| SQ0 | 0 | 0 | 0 |
| SQ1 | 0 | 0 | 1 |
| SQ2 | 0 | 1 | 0 |
| SQ3 | 0 | 1 | 1 |
| SQ5 | 1 | 0 | 1 |
| SQ6 | 1 | 1 | 0 |
| SQ7 | 1 | 1 | 1 |
| Signal when the bit has a value 1 | L5 | L6 | L7 |

Tables 5 and 6 give the values of the information written in the positions 1–7 of the signaller, these latter characterizing respectively the instruction and the sequential control code. The position 8 is reserved to an information I. Its value, designated by L8 or $\overline{\textbf{L8}}$, characterizes the fact that, when the instruction is executed, the signaller may call the computer CP or not (interrupt).

The various sequential codes have the following meanings:

SQ0: initial state (initial data supplied by the computer CP),

SQ1, SQ2, SQ3: intermediate states of the execution of the instruction (except for an instruction P8),

SQ5 + SQ6 + SQ7 + P8.(SQ2 + SQ3 .L8: End of operation with interrupt,

SQ5 + SQ6 + SQ7 + P8.(SQ0 + SQ3) .$\overline{\textbf{L8}}$: End of operation without interrupt, the computer CP interrogating, when it is free, the signallers having completed their task.

In the following paragraphs, the operations which are carried out in hardware in the circuit DF (FIG. 8) are summarized in the tables 7 to 19.

The presentation of these operations use symbols identified in table 3.

5. DATA TRANSFERS BETWEEN A MULTISIGNALLER AND A JUNCTOR 5.1. Introduction

One has described, in the paragraph 1, the setting up of the half-connection Sw and Aw by space and time selections under the control of signals obtained by the decoding of codes stored in the path memories.

The necessary codes are, for each half-connection:

A space selection code in the stage Q',

A space selection code in the stage Q,

A time selection code

Cx in the case of a half-connection Aw.

For the introduction of each of the codes in the corresponding memory, the computer supplies an instruction of the type X1 comprising said code as well as the identification codes of the address wherein they must be stored.

This instruction is stored in a particular signaller or transfer unit TU which is permanently connected to the superjunctor where the code must be stored and which assures, by a data transfer operation, first the selection of the junctor and of the address in this junctor wherein must be stored the code and second, the transmission of this code. Circuits are provided, in the junctor, for identifying these informations and for performing the necessary operations.

Such an operation of code introduction is called code modification and it is realized that the breaking of an half-connection constitutes an operation of the same type. The instruction P11 is intended particularly for carrying out code modifications in an address W$n$,$z$ (address $z$ of the word W$n$) and it enables the checking, in the transfer unit of the value of the modified code.

The instruction P9 controls the collection of the content of the address W$n$,$z$ and, eventually, the modification of the information. One will study in the paragraph 6.4 several examples of utilization of this instruction.

5.2. Connection of a transfer unit to the superjunctors

In each multisignaller, such as SU1, one or several signallers are assigned permanently as transfer units, this assignment being set up at the starting in operation of the switching center by writing P8 instructions in said signallers.

Each of these transfer units, such as TU*m* (signaller m read at time *t*S*m*), may control the data transfers with one of the two superjunctors, SJ1 or SJ8 for instance, according to the value, K or $\overline{K}$, of the marking information written in position 5 of TUm.

At time tm, this marking information is applied to the circuit LO (FIG. 8) which supplies marking signals MW covering either the times tSm and tAm or the time tAm. These signals are transmitted, over marking conductors external to the network SW, to the concerned superjunctors and they control directly, without the intervention of the space and time path memories, the setting up, at a time tAm, of a multiple half-connection Am between TUm and the address m of all the junctors of the superjunctor SJ1, for example (half-connection SU1:*t*A*m*/SJ1).

The circuit LO (FIG. 8) of the multisignaller SU1 supplies the marking signals over 4 conductors for the following logical conditions:

P8.tAm + (P9 + P11).tm.L5 = MW'1, Mw1 (Marking of SJ1)

P8.tAm + (P9 + P11).tm.$\overline{L5}$ = MW'8, MW8 (for Marking of SJ8), with $tm = tAm + tSm$.

It will be noted that the marking signals are present in *t*A*m* when an instruction P9 or P11 is in course of processing and also when the unit TUm is free (instruction P8). It results therefrom that, in these superjunctors, the addresses m appear always occupied and that they cannot be taken for any other type of half-connection.

A part of the junctor memory MJ (FIG. 6) constitutes the marking memory MMR wherein the bit M2 is used for marking the line *m* of all the junctors of the superjunctor which is connected with SU1 for the performance of an instruction P9 or P11. It will be seen, in paragraph 6.1, that this signal is used for determining the state of advancement of the instruction.

FIG. 11 represents the circuits DQ'1, DQ1, DQ8 associated to the switches Q'1, Q1, Q8 and which are used for the marking of two superjunctors SJ1, SJ8 from the multisignaller SU1. The connection SU1:*t*A*m* /SJ1 is set up by the switches Q'1, Q1. In the circuit DQ'1 the logical condition MW'1.*t*A controls the application of the code Cp8 (code selecting the input 8 of Q'1) to the decoder DS'1 and, in the circuit DQ1, the logical condition MW1.tA controls the application of the code Cp1 to the decoders DS1 to DS8 so that a multiple half-connection Am is set up between the unit SU1 and the addresses *m* of the memories of SJ1.

The same goes for the connection between SU1 and SJ8 which uses the marking wires MW'8 (in the circuit DQ'1) and MW8 (in the circuit DQ8).

It is therefore seen that, for the half-connections Am, the space paths are set up permanently by the connection of the marking wires to the superjunctors and that the space selection codes are obtained without using the space path memories. On the contrary, the time switching, i.e. the selection of the time *tm*, is free and several signallers of SU1 may be used as transfer units in each of the superjunctors SJ1 and SJ8. As it has been seen previously, this connection is carried out at the starting of operation of the switching center, under the control of a computer program.

5.3. Detailed description of the junctor

One has described, in paragraph 1.4 and in relation with FIG. 6, the block of memories MJ, the block of output registers RW which is associated to it and the circuits QSA (control of the space switch) and DC (block of decoders).

The junctor comprises also several other circuits which control the setting up of the normal half-connections A*w*, S*w* and the execution of the instructions of type X1.

These circuits are represented on the FIGS. 12 and 13 which must be grouped as shown in FIG. 22. One will note that, on these figures, one has shown only the output registers used for these functions and which are all registers wherein the informations are written successively in tTS and *t*A with the exception of the register RW7S. In order to simplify the figures, the input control gates associated with these registers have not been represented.

On these FIGS. 12 and 13 one has shown, in addition to the memories and the registers:

- the circuit EC which controls the writing in the memory of data received through the network SW over the group of conductors Ec. In normal operation (half-connection A*w* or S*w*) these informations are written in MDJ under the control of the signal S*p*. In data transfer operations (half-connection A*m*) they are stored in one of the words of the memory MJ under the control of the signals TR1, TR4, B'8 and the word selection signals W1, W2–W13 delivered by the decoder DW3 of FIG. 6.
- the data collection circuit LC wherein the selection is controlled either by the signal S*p* (half-connection A*w* or S*w*) or by the word signals W1, W2–W13 (half-connection Am). The informations are transmitted to the network SW over the group of conductors Ed.
- the identification circuit ID which supplies the frame identification signals (for the execution of instructions of type X1) and the half-connection identification signal which are used for controlling the operation of the peripheral circuits associated to the memory MJ (see FIG. 20).
- the scanning circuit EX comprising the register RW13 wherein is stored the result of a cyclic search. It will be noted that the content of this register is applied to the circuit LC as well as those of the output registers of the memories.
- the circuit VR to which are applied the informations supplied by the network SW over the 8-conductor bus E*c*. At time *t*2, this circuit delivers signals over 16 conductors enabling a positive write control in one of the NDRO memories of the block MJ.

5.4. Identification signals

The identification circuit ID supplies the different memory write control signals which are used in the circuit EC.

These signals are:

1. The signal Sp identifying a half-connection Sw or Aw which is elaborated for the logical condition:

$$Sp = \overline{B9.tS + (A12 + MW).tA}$$

In effect:

- the conditions B9.*t*S and $\overline{A12}.tA$ identify a tone half-connection described in the patent application *b*,
- the condition MW.*t*A identifies a half-connection A*m*. In all the other cases, one has a connection of type S*w* or A*w*.

2. The frame identification signals TR1 to TR4 which characterize a transfer operation of the type X1. The conditions of elaboration of these signals will be explicited in the following paragraph.

As it may be seen on FIG 12, the informations delivered by the circuit VR are stored, in presence of a signal S*p*, in the positions B1 to B8 of the memory MDJ.

In the absence of a signal Sp they are stored in one of the following memories:

memory MCT for the logical condition TR2, memory MSA for the logical condition: TR1.J5. The informations are those supplied over the conductors 1 to 4 of the bus Ec; the conductors 5 to 8 being connected to the decoder DJ5 which supplies the selection signal J5.

Any one of the memories represented on FIG. 12 for the logical condition: Ed8.TR3.W*n*. The signal Wn which controls the selection of the word Wn is supplied in TR2 + TR3 by the decoder DW3 (FIG. 6).

Last the memories MCT, MSA and the position M3 of the memory MMR receive a signal TR4 which controls the clearing of the address selected at this time. This is carried out by applying a signal over the resetting input of each position, said input being symbolized by a small circle.

6. THE INSTRUCTIONS OF DATA TRANSFER

As it n, been seen in the paragraph 5.1, a data transfer operation X1 concerns a collection and/or a code modification (with, eventually, a check of the correct writing of a new code) in the address W*n*z of a junctor, 6.1. The instruction P9

This instruction P9 concerns, by way of example, the memory address in SJ1 identified as follows:

Junctor SJ1.5 (junctor code CJ5)

Line *z* of the word W4 (codes C*z* and CW4).

and SJ5 and all the operations which are carried out in both these circuits.

Column 1 represents the order numbers of the frames which cover the duration of the operation with the corresponding values of the sequential code.

Column 2 represents the conditions of advance "-SEQAV" of the sequential code in the circuit DF (FIG. 8). This code advances by one position at each time tAm of the frames TR1, TR2 and — as the case may be — TR3.

Column 3 represents the operations of code transmission and reception for the data exchange as well as the transfers between positions in the signaller. The code CD′ transmitted to J5 comprises two parts:

The information written in position 32 of the signaller which is transmitted over the conductor 8 of the bus Ec. It indicates if the operation to be carried out is a data modification in the address W4, *z* (condition L32 = E*c*8) or if it is only the collection of data stored in this address (condition $\overline{L32}=\overline{Ec8}$).

The code CD written in the positions 25–31 of the signaller and which is transmitted over the wires E*c*1 to E*c*7. It constitutes the new data to be written in W4, *z* for the condition L32 = E*c*8.

It will be noted that at the end of the transfer, i.e. in TR3, the inactive instruction P8 is written in the positions 1–4 of the signaller so that the half-connection Am remains set up for the following frames in the absence of an instruction P9. These frames have been referenced symbolically, in this table, by "TR4+".

Nevertheless one will notice (column 3 of the table) that the instruction P8 controls the replacement of the marking signal MW of duration (*t*S*m* + *t*A*m*) by a signal MWO of duration tAm.

TABLE 7.—INSTRUCTION P9: DATA COLLECTION AND/OR DATA MODIFICATION

| TR | Transfer unit TUm | | Junctor J5 | |
|---|---|---|---|---|
| | SEQAV | Operations in tAm | Frame identification | Writing or reading in tAm |
| TR1 (SQ0) | SQ0.tAm →SQ1 | CJ5(13–16) } CW4(9–12) } Tf[Ec]<br>(17–24) Tf(9–16) | $\overline{Ec(0)}.\overline{M2}$.MW.tA-TR1 | St(M2,m)<br>CJ5=>J5<br>CW4→(W5,m) |
| TR2 (SQ1) | SQ1.tAm →SQ2 | Cz(9–16) Tf[Ec]<br>(25–32) Tf(9–16)<br>Z(17–24) | W3(0).W1(0).M2.MW.tA=TR2 | Cz→(W1,m) |
| TR3 (SQ2) | SQ2 | CD′(9–16) Tf[Ec]<br>CR[Ed]Tf(17–24)<br>Z(9–16),P8→(1–4) | $\overline{A12}$.M2.MW.tA=TR3 | [Ec8]CD→(W4,z)<br>CR(W4,z)<br>(CR)Tf[Ed] |
| | SQ2.$\overline{L8}$ →SQ0 | | | |
| TR4+ (P8) | | C0(9–16) Tf[Ec]<br>P8=MW0 | M2.$\overline{MW}$.tS=TR4 | Z(M2,m)<br>Z(W3,m)<br>Z(W1,m) |
| 1 | 2 | 3 | 4 | 5 |

The format of the instruction is represented on FIG. 10.

Table 7 groups all the data exchanges between TU*m*

The columns 4 and 5 assigned to the junctor J5 and to the superjunctor SJ1.5 give respectively the conditions of elaboration of the frame identification signals TR1 to TR4 and the operations which are performed in these circuits.

When at the time *tm*, defined in SJ1 by the signal MW, no operation of transfer takes place in the superjunctor, all the junctors deliver a signal $\overline{M2}$ and no information is received in *tAm*, over the group of conductors Ed. The decoder DJ5 elivers a signal Ec(0) and none of the logical conditions of the column 4 is satisfied.

On the contrary, if during the frame TR1 of a transfer operation, one has the condition $\overline{Ec(0)}$ it appears, in each junctor of SJ1 a signal TR1 which controls the following operations:

The bit M2 of the address *m* is set in 1 in all the junctors of SJ1,

The code CJ5 is applied to all the decoders DJ1–DJ8 of SJ1 and only the decoder DJ5 delivers a signal J5, the code CW4 is written in W3,*m* of the junctor J5 this word being selected by the signal J5 and one has then the condition $\overline{W3(0)}$ (decoder DZ, FIG. 6). As the address W1,*m* is still free, one has the condition W1(0).

The following frame TR2 is thus identified, in SJ1, by the condition W1(0).M2.MW.*t*A and the junctor J5 is identified by the fact that one has besides the condition $\overline{W3(0)}$. The signal TR2 controls then the direct transfer of the code Cz in the address W1,m.

As it has been seen previously, this code Cz, which is a base time code out of 96 codes is identified by the fact that its two most significant digits are different from zero. The corresponding condition $\overline{A12}$ appears, at time *tAm*, only in the junctor J5 and controls the elaboration of the signal TR3.

At this time tAm, the code Cz read in W1,*m* selects, in an asynchronous mode, the address *z* of the block of memories of MJ and the content of W3,*m* (code CW4) is applied to the decoder DW3 which delivers a signal W4.

If one receives a signal Ec8, the logical condition TR3,Ec8 (circuit EC, FIG. 12) controls the sending of the code CD to the word W4. This code is written in W4,*z* and the output E*d* of the junctor is blocked.

On the other hand the word CR, read in W4,*z* is transmitted to the signaller TUm over the bus E*d*. One sees then that the data collection is carried out in all of the cases (condition E*c*8 or $\overline{Ec8}$).

The frames TR4+ are identified, in TUM, by the reading of the code of the instruction P8 which controls the replacement of the signal MW of duration *t*S*m* + *t*A*m* by a signal MWO of duration *t*A*m*.

This signal MWO controls the general clearing, in all the junctors, of the addresses M2,*m* ; W3,*m* and W1,*m* concerned by the transfer (see column 5 of table and, on FIG. 12, the clearing commands in TR4).

In the junctors of SJ1, the marking signal is then absent in tSm and a signal TR4 is present during the frames TR4+.

6.2. Instruction P11

For the instruction P11 of data modification and of modified data check, the operations which take place at the frames TR1, TR2, TR4+ are carried out as for an instruction P9.

Table 8 represents thus only the frames TR3*a*, TR3*b* of this instruction which concerns the same address of memory as that chosen, by way of example, for the instruction P9.

In the junctor, the operations carried during the frame TR3a of P11 are the same as those which are carried out in the frame TR3 of P9 but the code CD1 comprises the condition L32 = Ec8 so that this code is written in W4,*z*.

During the frame TR3*b* (sequential code SQ3) the code CO (code zero) is transmitted and, the transfer being completed, the code of the instruction P8 is written in the positions 1–4 of the signaller.

In the junctor, both these frames are identified by the same signal TR3 which, as it has been seen previously, controls the asynchronous selection, at time tAm, of the address W4,*z*. In TR3*a*, the CR code which is read is transferred to TUm and the code CD may be written since the condition E*c*8 is present. In TR3*b*, the code CV which is read and which must be equal to the code CD which is written in TR3*a*, is transferred to TUm and, as one receives the code CO containing condition $\overline{Ec8}$, this code cannot be written in W4,*z*.

In the multisignaller, the codes CV and CD are compared and the signal KR is elaborated if they are identical. The result is a follows:

if one has the condition $\overline{KR}$, the sequential code is still SQ3, if one has the condition KR, the sequential code is modified and becomes SQ2 or SQ0 according to whether the unit TUm may interrupt or not the operation of the computer CP (condition L8 or $\overline{L8}$).

TABLE 8

Instruction P11 for data modification and check

| Transfer unit TUm | | | Junctor J5 | |
|---|---|---|---|---|
| TR | SEQAV | Operations at time *t*Am | Frame identification | Write or read operations at time tAm |
| TR3*a* (SQ2) | SQ2.*t*Am → SQ3 | CD1(9–16)Tf [E*c*] CR[E*d*]Tf(17–24) Z(16) | | CD → (W4,*z*) (CR)T*f* [E*d*] |
| | | | A12.M. MW.*t*A = TR3 | |
| TR3*b* (SQ3) | | CO(9–16)T*f*[E*c*] CV[E*d*]T*f*(17–24) Z(9–16), P8 → (1–4) | | |
| | SQ3.KR.L8 → SQ2 | | | |
| | | CV = CD = KR | | |
| | SQ3.KR.$\overline{L8}$ → SQ0 | | | |
| 1 | 2 | 3 | 4 | 5 |

6.3. Detailed description of the circuit LS

As it has been seen in paragraph 3.4, the operations which are summarized in the columns 2 and 3 of the tables 7 and 8 are carried out in the logical block LS (FIG. 8) of the multisignaller, either in real time (circuit LO) or in delayed time (circuit DF). Table 9 regroups the operations mentioned hereabove according to the circuit in which they are carried out.

FIG. 14 represents the transmission logical circuit LO which comprises:

TABLE 9.—LOGIC OPERATIONS IN THE MULTISIGNALLER FOR THE DATA TRANSFER (DATA TRANSFER TOWARDS SUPERJUNCTOR SJ1)

| Operations | | | Time slots | | | |
|---|---|---|---|---|---|---|
| Type | Circuit | Detail | tSm | tAm | tS(m+1) | Logical signal |
| Misc. | L0 (fig. 8). | Marking (§ 5.2) MW | x | x | | (P9+P11).L5 (1) |
| | | Marking (§ 5.2) MW0 | | x | | (P8.tA).$\overline{L5}$ (2) |
| | | Signaller calling (Signal SC) | x | x | | P8.I.(SQ2+SQ3) (3) |
| Transmission and reception through SW | | (9-16) Tf[Ec] | | x | | P8+P9+P11 (4) |
| | | CR[Ed]Tf(17-24) | | x | | A4=P9.SQ2 |
| | | CV[Ed]Tf(17-24) | | x | | +P11.SQ3 |
| Internal SU operations | | (17-24) Tf(9-16) | | | x | A1=(P9+P11).SQ0 |
| | | (25-32) Tf(9-16), Z(17-24) | | | x | A2=(P9+P11).SQ1 |
| | | Z(16) | | | | A3=P11.SQ2 |
| | DF (fig. 8). | Z(9-16), P8→(1-4), CV≡CD | | | x | A4=P9.SQ2+P11.SQ3 |
| SEQAV | | | | | x | SQ0→SQ1 |
| | | | | | x | SQ1→SQ2 |
| | | | | | x | SQ2.P11→SQ3 |
| | | | | | x | SQ3.KR.L8→SQ2 |
| | | | | | x | (P9.SQ2+P11.SQ3.KR) $\overline{L8}$→SQ0 |
| 1 | 2 | 3 | 4 | 5 | 6 | 7 |

The decoder DPR associated to the positions 1–4 of register RSU and which delivers the signals P0, P1, P8, P9 and P11 characterizing the instructions bearings the same references and the signal X1 = P8 + P9 + P11 (see table 4).

The call circuit SCL supplying a call signal for the computer CP for the condition : SC = (L1.L5 +P8.L6).I.

The first part of this equation does not concern the instructions of type X1 and will be explicited later on.

For the second part, corresponding to the equation 3 in table 9, the table 5 shows that L6 = SQ2 + SQ3 for an instruction of type X1 for which the sequential code never takes the values SQ5, SQ6 or SQ7.

The space marking circuit SMW supplying the marking signals according to the equations 1 and 2 of table 9.

These signals are those which control the connection of the multisignaller SU1 to one of the superjunctors SJ1 or SJ8. As it has been seen in paragraph 5, the choice between the two superjunctors depends upon the value, L5 or $\overline{L5}$, of the bit 5 of the signaller.

The transmission gate Trm which is open for the logical condition X1 + P1 [equation 4 of table 9 for an operation of type X1] and which enables to transmit in real time, over the bus Ec, the content of the positions 9–16 of RSU. It is thus seen that, for a signaller seized permanently as a transfer unit, the content of positions 9–16 is transmitted at each frame.

As it can be seen on FIG. 8, the content of RSU is transferred, in *t*A.*c*, to the register RDF and is applied to the modification circuit DF.

FIG. 15 represents the elements of this circuit DF which are used for the execution of the instruction P9. These elements are :

The program decoder DPF delivering the signals P8, P9, P11,

The sequential decoder DSQ delivering the signals SQ0 to SQ3,

The circuit AP9 for the microprocessing of the instruction P9.

The circuits AP9 and AP11 (this latter is not represented on FIG. 15) control the following operations grouped in the lower part of table 9 ;

a. Advance of the sequential code, b. modification of the contents of MSU,*r* under the control of the signals A1 to A5 — columns 7 of table 9 . It will be reminded that the memory MSU is of the NDRO type so that one carries out a writing only when a modification must be made.

The operations grouped in column 3 of table 9 are as follows for an instruction P9 :

1. Code transfers in positions 9–16 of MSU. Under the control of the signals A1 and A2 the content, respectively, of the positions 17–24 and 25–32 is transferred in positions 9–16.

2. Modification of the content of positions 9–16. A signal A4 controls the clearing in positions 9–16. As this signal characterizes the frame TR3, it results thereof that zero codes are transmitted over the group of conductors Ec for the frames TR4+.

3. Modification of the content of positions 17–24. The signal A2 characterizing the frame TR2 controls the clearing of these positions which are then available for writing the code CR received over the group of conductors E*d*. This code is written under the control of the signal A4.

4. Comparison. No modification is carried out in positions 25–38 so that the code CD1 is always available for being compared with the code CV under the control of the signal A5 (frame TR3*b* of P11).

For an instruction P11, the only differences are :

the signal A3 controls the clearing of position 16, the signal A4 controls the writing of the code CV and its comparison with the code CD1 (the comparator is located in the circuit DF).

6.4. Examples of utilization of the data transfer instructions.

The instructions P9 and P11 are used for controlling the following operations :

1. Modification, in a superjunctor, of the codes identifying a half-connection S*w* or A*w* (setting up or breaking a connection). In this case, one may use an instruction P11 for the checking of the modified codes.
2. Search of the codes written in the address *z* of the junctor of a superjunctor. In this case, the program used selects successively all the junctors by modifying the value of the code CJ in a succession of instructions P9.

3. Free channel search in a trunk : the program used selects successively the lines of MST/I (code CW6) or of MST/P (code CW7) by modifying the value of the code Cz in a succession of instructions P9. As it has been seen in paragraph 1.4, each of these memories delivers, in tx, a free channel signal FI or FP when the correspondign channel x is free (see FIG. 12).

Another utilization of the instruction P9 is to carry out, by means of the circuit EX (FIG. 13), cyclic scannings in some memories of the block MJ :

a. Incoming channel scanning for call detection : For this operation one uses, in the circuit EX, the free channel signals FI and FP, as well as the signals CHI, CHP delivered by MSI/I, MST/P and which characterize, at time *tx*, a change of signalling state over the channel *x*.

A calling channel is then detected by one of the signals:

$$SI = CHI.FI.\overline{Da}.tS \text{ (gate Ga1) or}$$

$$SP = CHP.FP.\overline{Da}.tA \text{ (gate Ga2).}$$

This signal SI or SP controls the transfer of the time code Ctx into the register RW13.

The collection of this result is carried out under the control of a special program of the computer CP comprising, at regular intervals, instructions P9 wherein the code CJ is variable in order to scan all the trunks of the superjunctor. Each of these instructions comprises the code CW13 (signal W13 supplied by the decoder DW3, FIG. 6) which enables to transfer to TUm the contents of RW13.

b. Identification of the time *t*Ay of a half-connection Aw : In this type of operation the initial data are the time *t*S*x* of the half-connection S*w* and the junctor SJ2.5 used. A marking information is first written in the address M1,*x* of the memory MJ. Further on the content of this position M1 is read in a synchronous way at each time *t*S and in any asynchronous way at times *t*A and the information read is applied to the circuit EX. For the considered connection, the code C*x* is read, in *t*Sy, in the memory MCT and controls, in *t*Ay, the reading — in the address M1,*x* — of the marking information MA. This signal MA controls the writing of the time code Cty in the register RW13 (gate Ga3).

This operation of identification is carried out under the control of a sub-routine of two instructions P9*a* and P9*b*.

The code modification instruction P9*a* contains the initial data constituted by the codes CJ5, CW10, C*x* and controls the writing of the marking information in M1,*x*. The instruction P9*b* controls the collection of the result, as in the case of the call detection. It comprises the codes CJ5 and CW13.

One will notice that, in these two types of cyclic scanning, the results are obtained by collecting data in the register RW13 which is addressed as if were a memory output register.

The circuit EX operates in the following manner :

In the absence of an identification operation, the flipflop Da is in the <u>0</u> state (condition $\overline{Da}$) and the flipflop D*b* in the <u>1</u> state (condition D*b*). The 8-bit codes Ct which define the succession of $g = 192$ time slots tS and *t*A are transferred successively, at the fine time *a*, in the register RW13 (this latter is cleared at each time *d*2). As soon as a calling channel signal SI or SP appears, the flipflop D*b* is reset at the time *t*S*x* for example and the transfer of the codes C*t* in RW13 is stopped so that this register contains the code C*t*x identifying the calling channel.

For an identification, the signal which controls the writing of the marking signal in the address M1,*x* (signal TR3.E*d*8.W10) controls also the setting in the <u>1</u> state of the flipflops D*a* and D*b*. The condition D*b* controls the clearing of RW13 and the condition D*a* controls the blocking of the gates G*a*1, G*a*2 (stopping of the call detection) and the activation of the gate G*a*3 so that the signal MA controls, in *t*Ay, the resetting of the flipflop D*b*. The register RW13 contains then the required code Cty.

One will observe that the instruction P9*a* controls, in TR3, the stopping of the call detection and that the instruction P9*b* is separated from this frame PR3 by at least three frames, vizus the frame TR4 of P9*a* and the frames TR1, TR2 of P9*b*. One has thus available a time sufficient for scanning cyclically all the addresses of MJ.

7. SIGNALLING SUPERVISION ONDER THE CONTROL OF THE MULTISIGNALLER

As it has been seen in paragraph 4, the instructions P4 and P7 control different operations concerning the supervision of the incoming signalling, these operations being grouped under the designation of "Functions of type X2".

For each of these instructions, the multisignaller SU comprises a unique instruction processing circuit AP4–AP7.

7.1. Modes of connection of a signaller

An instruction of the type X2 belongs to a program, such as for example a digit analysis program, which begins with instructions P9 or P11 controlling the connection of the signaller to the channel to be supervised.

One distinguishes two types of connection :

a. The connections for supervisising the incoming signalling : these are normal connections between the signaller and the channel to be supervised which are set up for performing the following instructions:

P4 : signalling level measurement,

P5 : test of the duration of a signalling level,

P7 : digit reception enabling the selection of the outgoing trunk.

The instruction P2 of digit sending, which will be described in paragraph 9, uses also a connection of this type.

b. The connection for supervising the signaling which is transmitted, through the switching center, over the selected outgoing trunk. In this case, the calling channel (half-connection S*w*) and the called channel (half-connection A*w*) are connected by means, for example, of the junctor SJ2.1. The signaller is then connected to the calling side through another junctor SJ2.2 of the same superjunctor. The type of connection is described in the patent application referenced *b*.

7.2. Signalling characteristics

Over a calling channel, the digits are received as pulses of period 96 ms and of duty factor two-thirds as it may be seen over the FIG. 16.*a*. On this figure, the pulses are hatched and have a duration of 64 ms. The pulses of two consecutive digits are separated by a duration IDP high than or equal to 120 ms (see FIG. 16.*b*).

By way of a non-limitative example, one will describe the signalling supervision for a PCM switching center located in a network using a step-by-step numbering with a signalling associated to the channels with the following characteristics:

each message in a channel comprises $p = 8$ digits B1, B2–B8, the odd frames, which will be designated by the reference F1, are reserved to the transmission of the signalling data on the bit B1. The digit time slot m1 of each frame F1, which is reserved for processing this bit in the center, is referenced T1.

each group of 16 odd frames F1 constitutes a multiframe F16 of duration 32 × 0,125 = 4ms, the beginning of which is identified by a signal T16 having a duration of one frame. A multiframe F16 is the time interval during which one examines the incoming signalling over a channel.

When this signalling concerns a numbering, it is constituted, in each multiframe, by a succession of 16 bits of value 0 or 1 defining respectively a "high level" AZO and a "low level" AON as it is indicated on FIG. 16.*a*.

When the received signalling concerns the response from a distant central exchange to an order, it is constituted by a succession of digits 0 and 1 defining an "average level" of signalling ASW.

The signalling analysis for obtaining the value of the level is carried out in the signalling detector SDT. This value of level constitutes the information of detected signalling state DS and it is elaborated at the end of each multiframe F16.

7.3. General diagram

FIG. 17 represents the elements of the circuit DF which are used for executing the instructions P4 to P7 as well as the register RDF and the address MSU,*r*.

TABLE 10

Definition of the signalling levels in T16(*j*)

| State | | Value |
|---|---|---|
| DS | detected state | Signalling level measured during multiframe F16(*j*) |
| SS | expected state | Signalling level measured during multiframe F16(*j*–1) |
| CS | confirmed state | The same level is measured in F16(*j*–a9) and F16(*j*) after a level discordance PK in F16(*j*–a9) |

The initial format of the signaller, the content of which is transferred at time *tSr* to the circuit LO (FIG. 8) and at time tS(n+1) to the circuit DF (FIGS. 8 and 7), is as follows:

1. Positions 1–16

Positions 1–8 : informations P, SQ, I,

Positions 9–16 : signalling state CS,

Positions 11–12 : signalling state SS,

Positions 13–16 : number of pulses. The final value CD of this number characterize the value of the received digit.

2 Positions 17–32 a. For a program P4, P6, P7 :

Position 17 : information PK characterizing a level discordance measured over two successive multiframes, Positions 18–19 : information AC and SC characterizing the distribution of the 0 and 1 digits in the received signalling, Position 20 : information PB characterizing the value of B1 in the preceding odd frame, Positions 25–32 : time delay counter CT, b. for a program P5 :

Positions 17–24 : a time interval defined by a code CT*n*,

Positions 25–32 : measurement of this time interval by decounting from the code CTn (counting of the code $\overline{CTn}$).

The elements of the circuit DF represented on the FIG. 17 are:

The signalling detection circuit SDT to which are applied the signalling digit B1 and the informations AC, SC, PB and which supplies at the end of each multiframe, the signalling level DS and the new values of SC, AC, PB. These informations are applied to the circuit APa.

The persistence logic circuit PLG which receives the information CS, SS and DS. This circuit delivers the signals of changement RA, RB, CH which are applied to the circuit AP*a*.

The circuit APa which controls the processing of the instruction P*a* (*a*=4,5, 6 or 7).

The time delay counter constituted by the bits 25–32 of the signaller and which contains the preceding value of time delay CT, the circuit of addition of one unit KCT receiving the advance signals over the input T*b* and the decoder DCT. This code CT, which may be increased or not by one unit, is then re-written in MSU,r.

7.4. Signalling detection circuit

The table 11 groups the logical operations of the processing of the informations SC, AC and PB, under the control of signals T1 and T16. The operation of the processing circuit SDT may be divided into three phases:

I. Initialization : When an instruction P4 to P7 is introduced in the multisignaller SU during a multiframe (condition T16), one has the condition SQ0 until the first signal T16 as these instructions are processed — as it will be seen further on - only once per multiframe. When a signal T16(*j*) characterizing the beginning of the jth multiframe F16 appears, it controls the setting of the conditions SC and AC (equation 2) in MSU,*r*.

TABLE 11

Signalling detector SDT

| Phase | Orders | Destination |
|---|---|---|
| Initializing | $\overline{T16}$.T1.SQ0→ $\overline{SC}$, $\overline{AC}$ (1) | |

| | | |
|---|---|---|
| [signal T16($j$) ] | T16 → $\overline{SC}$, AC (2) | MSU,$r$ through AP$a$ |
| Measure | T1.B1 → PB (3) | |
| | T1.(B1 ≡ PB) → $\overline{AC}$ (4) | |
| [Multiframe F16($j$) ] | T1.(B1 ≡ PB) → $\overline{SC}$ (5) | |
| Elaboration of state information | T16.AC → ASW (11) | PLG and |
| T16.SC.PB AON (01) | | |
| DS | T16.SC.$\overline{PB}$ → AZO (10) | MSU,$r$ through AP$a$ |
| [Signal T16($j$+1) ] | T16.$\overline{AC}$.SC → AX (00) | |

2. Measurement : The measurement of the signalling level is performed during all the duration of the multiframe F16($j$) by comparing, each time that an odd frame signal T1 appears — such as the signal T1($k$+1) —, the present value B1 of the signalling bit to its preceding value PB. This value PB has been obtained by storing the value B1 received in T1($k$) in the position 20 of MSU,$r$ (equation 3).

When the signalling informations are identical in T1($k$) and T1($k$+1) equation 4 it is decided that no alternance of 0 and of 1 is received and the condition $\overline{AC}$ is written in position 19 of MSU,$r$. In the opposite case equation 5 it is decided that identical digits are not received and the condition $\overline{SC}$ is written in position 18 of MSU,$r$.

It will be noted that the new informations to be written in MSU,$r$, which are elaborated during these two phases, are transferred to MSU through the instruction circuit AP$a$.

3. Elatoration of the signalling state information DS : Each signal T16 controls the elaboration of the signalling level of information according to the following criteria :

If the condition AC is present, this means that B1 and PB have never been identical in the multiframe : one has thus the level ASW (alternance of 0 and 1), If the condition SC is present, this means that B1 and PB were always identical in the multiframe : one has thus either the level AON for the condition PB (series of 1) or the level AZO for the condition $\overline{PB}$ (series of 0), If the condition AC.SC is present this means that the received series of bits is not regular : one has thus received a signalling of indetermined level AX.

These values of level are expressed by a 2-digit number written between brackets in the table 11.

This value of the detected signalling state DS is transmitted first to the circuit PLG and second to MSU,r through the circuit APa.

7.5. Persistence logical circuit

Table 12 groups the logical operations which are carried out in the circuit PLG at each multiframe T16.

It will be reminded that the algorithm of determination of the state CS is as follows : if the level of the received signalling is the same over the two successive multiframes after a change of level, this level is taken as confirmed signalling state CS.

As it is indicated in part 1 of table 12 a signal PK read in MSU,$r$ at T16($j$) characterizes a change which occurred at a preceding multiframe shown symbolically by the reference T16(<$j$).

In the circuit PLG, one carries out several comparisons between the different signalling state informations as shown in part 2 of the table.

The various logical operations are grouped in the part 3 of the table. Their meaning is as follows :

TABLE 12

Persistence logical circuit PLG

| | Logical conditions | Meaning in T16($j$) | Signal | Action controlled by AP$a$ in T16($j$) |
|---|---|---|---|---|
| 1 | PK | Level change in T16(<$j$) | | |
| | SS ≡ DS | Same level in T16($j$) and in T16($j$–1) | | |
| 2 | SS ≡ CS | No level change in T16($j$) or in T16($j$–1) | | |
| | CS ≡ DS | Stable state | | |
| | (SS ≡ CS) .(CS ≢ DS) (1) | Level change | RA | PK, DS→ (11–12) |
| 3 | (CS ≡ DS).PK (2) | The level change in T16($j$–1) was brought by a transient perturbation | RB | $\overline{PK}$, DS→ (11–12) |
| | (SS ≡ DS) .(CS ≡ DS).PK (3) | The level change in T16($j$–1) is confirmed. The state DS is taken as state CS. | CH | $\overline{PK}$, DS → (11–12) DS →(9–10) |

When the equation 1 is satisfied, this means that a level change is detected which controls the sending of a signal RA to the circuit AP$a$.

When the equation 2 is satisfied, this means that the levels measured in T($j$) and in T($j$–2) are identical, i.e. that the level change detected in T($j$–1) was due to a transient perturbation. A signal RB is then sent to the circuit APa.

When the equation 3 is satisfied, this means that the measured levels are identical in T($j$) and in T($j$–1) , i.e. that the level change detected in T($j$–1) is confirmed. The circuit PLG supplies then a signal of confirmed level change CH.

As it can be seen in the last column of table 12, the operations which are performed by means of the circuit APa are as follows :

1. Writing of the information PK or $\overline{PK}$ in the position 17 of MSU,r.
2. Transfer of the value of the state DS either in positions 9–10 or in positions 11–12 of MSU,r.

These operations are performed under the control of a wired logic in the instruction circuit but they are independent from the value of the sequential code SQ with the exception of the transfer of DS in positions 9–10.

FIG. 18.$a$ is a time diagram grouping the succession of the operations over several multiframes F16 in the case where a level change is detected and confirmed.

FIG. 18.$b$ is the same diagram in the case where a change has been detected and not confirmed (transient perturbation).

Each of these figures comprises four lines assigned respectively to the writing of the value of the informations PK, CS, SS and DS. The first three informations which are stored in MSU,$r$ can be modified only in presence of a signal T16. Their values are written, in FIGS. 18.*a* and 18.*b*, between two signals T16.

The value DS obtained under the control of a signal T16 is written in a circle located at the time T16. The two different signalling levels are referenced S1 and S2.

The arrows directed towards the right hand side represent symbolically the transfer operations (DS)Tf(SS) or (DS)Tf(CS). The dashed lines represent symbolically the comparisons between CS and DS and between SS and DS.

8 INSTRUCTIONS OF SIGNALLING SUPERVISION

8.1 Measurement of the signalling level (Instruction P4)

One will now describe the processing of the instruction P4 by means of the instruction circuit AP4 represented on FIG. 19.

Table 13 groups the operations which are carried out in this circuit and which concern the advance of the sequential code SQ as well as the operations controlled by said codes.

The circuit AP4 of the FIG. 19 comprises:

- The transfer circuit A4a which controls the modifications in MSU,*r* either in P4.T16 for the positions 5–7, 9–12 and 17 or in P4 for the positions 17–20.
- The sequential code modification circuit A4b which delivers the modification signals according to the conditions indicated in the corresponding column of table 13.
- The circuit of modification A4c of the informations CS, SS and PK. As it has been mentioned in the preceding paragraph, the value of the state DS is always stored in the positions 11–12. It is also transferred in the positions 9–10 for the three cases indicated in the table 13, the transfer for the condition SQ1 being the initialization at the beginning of the processing of the instruction. As to the modification of the state PK, it is carried out under the control of the signals RA, RB, CH and also at the beginning of the processing of the instruction (clearing, initialization).

It is thus seen that this instruction P4, which is processed during 3 or 4 multiframes F16 (8 to 12 ms), controls the measurement of the signalling level and the detection of level change. It may be used, for example, in order to know the new signalling level in a channel when a change has been detected by other means. For this purpose, the initial data written in positions 9–10 is the level value AX.

8.2. Test of the duration of a given signalling level (Instruction P5)

The table 14 groups the operations which are performed in the instruction circuit AP5. They concern the test of the duration of a given signalling level SO (one of the levels AON, AZO, AX OR ASW).

The initial data for this instruction are the level value SO written in the positions 9–10 of the signaller and the duration of the test defined by the value of the code CTn written in the positions 17–24 (see FIGS. 10 and 17). This code CTn defines a duration of n multiframes F16, vizus *n* times 4 ms.

TABLE 13

Instruction P4 (Measurement of the signalling level

| SEQAV | Z/Tf |
|---|---|
| T16.SQ0 → SQ1 | Z(17) |
| T16.SQ1 → SQ2 | DS → (9–10) |
| T16.SQ2.CH → SQ7 | DS → (9–10) |
| T16.SQ2.$\overline{CH}$ → SQ3 | |
| T16.SQ3.CH → SQ7 | DS → (9–10) |
| T16.SQ3.$\overline{CH}$ → SQ7 | |

TABLE 14

Instruction P5 (Test of the duration of a given signalling level)

| SEQAV | CTAV : T16 → +1(25–32) Z/Tf |
|---|---|
| T16.SQ0 → SQ1 | $\overline{(17–24)}$Tf(25–32) Z(17) |
| T16.SQ1.CH → SQ6 | DS → (9–10) |
| T16.SQ1.C255 → SQ7 | |

At the first signal T16, the complement of the code CT*n*, vizus $\overline{CTn}$, is transferred in the positions 25–32 of the signaller which are reserved to the time counter. At each multiframe T16, the value $\overline{CTn}$ increases by one unit and if the circuit PLG does not deliver a signal CH, the decoder DCT (FIG. 17) delivers a signal C255 when the time defined by the code CT*n* has elapsed. This signal controls the setting of the sequential code in position SQ7 characterizing the end of the test and the level SO is taken as detected state DS. In the opposite case, the sequential sets in position SQ6 characterizing a change of signalling state before the end of the test and the measured level DS, which has a value different from SO, is written in the positions 9–10.

TABLE 15

Instruction P7 (digit reception)

| SEQAV | CTAV : T16 +1(25–32) Operations | Remarks |
|---|---|---|
| T16.SQ0 → SQ1 | Z(17), Z(25–32) | Initialization 1 |
| T16.SQ1.CH.AZO→ SQ2 | DS → (9–10),Z(25–32) | Change from AON to AZO |
| T16.SQ2.C6 | +1(13–16) | Measurement of the length of a pulse (D6 =24 ms) 2 |
| T16.SQ2.CH.AON → SQ3 | DS → (9–10),Z(25–32) | Change from AZO to AON |
| T16.SQ3.CH.AZO → SQ2 | DS → (9–10),Z(25–32) | New change from AON to AZO |
| T16.SQ3.C30 → SQ7 | | End of reception of the pulses of a digit 3 A-ON(9–10) - - (C30=a ms) |
| T16.SQ2.C45 → SQ6 | | Premature on-hooking AZO(9–10) 4 |
| T16.(SQ1+SQ2+SQ3).CH. (ASW+AX) → SQ5 | | Indetermined line level : AX(9–10) or ASW(9–10) |

The circuit AP5 has a design similar to that of the circuit AP4 and will not be described in detail. It will be only noted that the state DS is written only in the positions 9–10 for the condition SQ1.CH and that the advance signal of the counter KCT (FIG. 17) is supplied for the logical condition T*b* = P5.T16.

This instruction P5 may be used, for example, for checking the on-hooking of a subscriber's set over a duration defined by the value of the code CTn (for example for $n = 255$, the measurement duration is of about 1 second). 8.3 Digit reception (Instruction P7)

The instruction P7 is used for counting the number of pulses defining a digit.

FIG. **16.*a* represents the pulses of period 96** ms which will be defined in paragraph 7.1 and the counting process of said pulses. For this instruction the computer supplies, as initial data, the level code AON which is written in the positions 9–10 (signalling state DS).

The operations are grouped in the table 15 and they are carried out as follows. First, the sequential code sets in position SQ1. Then, at the first signal CH for which a level AZO is measured, the sequential code is set in SQ2 and the duration of this level is measured. If it is higher than 24 ms (signal C6) it is decided that a pulse is received and one unit is added to the pulse counter KCT (FIG. 17). At the following signal CH, if a level AON is measured, the sequential code is set in SQ3. At last, when a signal CH appears again, the code is set to SQ2 if a level AZO is measured and the same operation starts once again for the detection of the next pulse.

If the state AZO lasts more than 180 ms (signal C45) whereas the duration of the pulse must be of 64 ms, it is decided that the subscriber's set has been prematurely on-hooked and the sequential code is set to SQ6.

If the state AON lasts more than 120 ms (signal C30) it is decided that the reception of the pulses relative to a digit is finished (see FIG. 16.*b*) and the sequential code is set to SQ7.

Last if a change has given a level value ASW or AX, it is decided that the level on the line is undetermined and the code is set to SQ5.

When the code value is SQ7 and that the computer CP collects the value of the digit (content of the positions 13–16), said computer has means for determining its order number. If digits are still to be received, it sends a new instruction for each of them. In the opposite case, in a tandem switching center with step by step numbering, the computer sends an instruction P6.

8.4. Detection of end of numbering (Instruction P6)

When the digits enabling the selection of the outgoing trunk have been obtained with instructions P7, the computer CP sends an instruction P6 which controls the supervision of the following digits to be sent, without decoding, towards a remote center, this supervision enabling to detect the end of the numbering.

This instruction, the various operations of which are grouped in the table 16, develops along in the same way as the instruction P7 and the parts 1, 2 and 4 of the tables 15 and 16 are absolutely identical.

As it may be seen in the upper part of table 16 the advance of the delay counter CT is carried out at different speeds according to whether one has to deal with the operations grouped in parts 1, 2, 4 or in part 3 of the table. In (SQ1 + SQ3), the counter advances at the rate of the signals T64 defining the beginning of multiframes F64 having a duration of 64 odd frames and the code C255 defines then a duration of four seconds characterizing the end of the numbering (see FIG. **16.*c***).

9. VARIOUS INSTRUCTIONS

The directory of instructions given by way of example at the paragraph 4 comprises also the digit transmission instruction P2 and the path check instruction P1.

9.1. Digit transmission (Instruction P2)

This instruction may be used for transmitting, over an outgoing trunk, three digits constituted by the contents of the bytes DG1, DG2, DG3. The different operations are detailed in the table 17 where are used the following references:

CGO – CG15 : numbers 0 to 15 written in BCD code in the pulse counter CG,

DG20 (DG30) : the byte DG2 (DG3) contains the number zero.

TABLE 16

Instruction P6 (detection of the end of numbering in step by step numbering)

CTAV : { T16.SQ2 +1(25–32)
T64.(SQ1+SQ3) +1(25–32)

| SEQAV | Operations | Remarks | |
|---|---|---|---|
| T16.SQO→ SQ1 | Z(17), Z(25–32) | Initialization | 1 |
| T16.SQ1.CH.AZO→ SQ2 | DS → (9–10),Z(25–32) | Change from AON to AZO | |
| T16.SQ2.C6 | +1(13–16) | Measurement of the length of a pulse (C6=24 ms) | 2 |
| T16.SQ2.CH.AON→ SQ3 | DS → (9–10),Z(25–32) | Change from AZO to AON | |
| T16.SQ3.CH.AZO → SQ2 | DS → (9–10),Z(25–32) | New change from AON to AZO | |
| T16.(SQ1+SQ3).C255 SQ7 | | End of numbering AON(9–10) (C255=4 seconds) | 3 |
| T16.SQ2.C45 → SQ6 | | Premature on-hooking AZO(9–10) | 4 |
| T16.(SQ1+SQ2+ SQ3).CH. .(ASW+AX) → SQ5 | | Indetermined line level: ASW+AX(9–10) or ASW(9–10). | |

The initial data used in this instruction are these three digits as well as the information S = 1 written in position 9.

By examining the upper part of the table, it is seen that, at each odd frame F1 (signal T1), the value 1 or 0 of this information is transmitted as signalling bit over the conductor Ec1 (first conductor of the bus Ec, FIGS. 8 and 14) and that, at each multiframe, the content of the time delay counter is advanced by one unit.

The different phases or the transmission of three digits are explicited in table 17. It will only noted that:

The transmission starts by the sending, during 672 ms (code CT = C168), of ones corresponding to a level AON so that two successive digits are separated by an interval IDP = 672 ms.

TABLE 17

Instruction P2 (Digit sending)

CTAV : T16 → +1(25–32)
Signalling : T1 → (9)T*f*[Ec1]

| SQ | Phase | SEQAV in T16 | Operations |
|---|---|---|---|
| SQ0 | Initializing for the beginning of digit sending | | $(\overline{25-28})Tf(13-16)$ Z(25–32) |
| | Pre-sending level AON | SQ0.C168 → SQ1 | Z(25–32), Z(9) |
| SQ1 | Sending of a pulse (level AZO) | SQ1.C16 → SQ2 | +1(13–16), St(9) |
| SQ2 | Interval between a pulse and the next one (level AON) | SQ2.C24.$\overline{CG15}$ → SQ1 | Z(9) |
| | End of sending of a digit (level AON) | SQ2.C24.CG15 → SQ3 | Z(25–32) |
| SQ3 | Interval between two digits and initializing for the sending of the next digit (level AZO | SQ3.Cl68.$\overline{DG20}$ → SQ1 | $(\overline{21-24})Tf-13-16)$ Z(25–32), Z(9) |
| | | SQ3.C168.$\overline{DG30}$ → SQ1 | $(\overline{17-20})Tf(13-16)$ Z(25–32), Z(9) |
| | End of digit sending (level AZO) | SQ3.C168.DG20.DG30 → SQ7 | |

TABLE 18

Instruction P1 (Path check)

| SEQAV | T1 : CKT(9–16)Tf[Ec] Operations |
|---|---|
| T1.SQ0 → SQ1 | |
| T1.$\underline{SQ1}$ → SQ2 | CKR [Ed] Tf(17–24) |
| SQ2.$\overline{KRC}$ → SQ5 | DRV = CRA→ $\overline{KRC}$ |

In order to count the number of pulses transmitted, one transfers in the positions 13–16 (counter of pulses CG) the complement of the numbers written in the bytes DG1, DG2 or DG3. This value is increased by one unit at the end of the transmission of each pulse (condition SQ1.C16).

The transmission of one digit is completed when the counter CG stores the code CG15 and these operations are resumed for the following digits after the sending of the level AON during a duration of 672 ms.

When the last digit is sent, the sequential code is set in SQ7 after sending the level AON during 672 ms.

9.2. Path check (Instruction P1)

This instruction is used for checking the space paths and the time paths established between two signallers belonging to the same multisignaller or to different multisignallers. One of these signallers is then connected to the junctor by a half-connection Sw and the other by a half-connection Aw.

The data supplied at each signaller by the computer is a same check code CK which is stored in the positions 9–16 and which constitutes the information CKT which will be sent over the group of conductors Ec (see FIG. 14). The code received over the group of conductors Ed, and which constitutes the information CKR, is stored in the positions 17–24. As it can be seen on table 18, the code CKT is transmitted at each odd frame and one sets the sequential code in SQ5 if the received code CKR is different from CKT.

While the principles of the above invention have been described in connection with specific embodiments and particular modifications thereof it is to be clearly understood that this description is made by way of example and not as a limitation of the scope of the invention.

We claim:

1. A switching system comprising a first multisignaller for executing a plurality of instructions supplied by a switching computer employing a stored program, said first multisignaller employing wired logic, a PCM switching center, said first multisignaller and said switching computer assuming the functions of centralized control circuits for the PCM switching center, said first multisignaller comprising means for connecting the first multisignaller to a switching computer via a group of trunks with $g/2$ channels, memory means incorporating a memory of $g/2$ addresses operable in time division multiplex to store simultaneously the instructions concerning $g/2$ operations in the course of execution, means coupling said first multisignaller to the PCM switching center over g channels to enable connection of the first multisignaller either to a junctor, or to a trunk, or to a second multisignaller to carry out data transfers under the control of the stored instructions, means in the PCM switching center for comparing received data with transmitted data for determining the next operation, means for identifying each phase of an instruction by the value of a sequentially coded instruction, whereby, when all the operations are completed, the final value of the sequentially coded instruction indicates the result of the operation and alerts the first multisignaller and enables it to immediately call the computer if interrupt information is written in a particular position of the instruction.

2. A switching system according to claim 1 in which data transfer between the first multisignaller and a junctor involves five frames of information and concerns data collection in said junctor, together with data modification and a check of the modified data, means by which said transfers are carried out by writing, in a signaller, an instruction which controls the operation of a transfer unit, each of said instructions comprising a plurality of sub-instructions including a first for selection of the junctor and of the address concerned in the junctor which uses two frames, a second for data collection and data modification which uses a single frame, a third for a modified data check which uses a frame and a fourth for the end of operation which uses a frame.

3. A switching system as claimed in claim 2, in which the different frames are controlled in time succession by interpretation in an instruction processing circuit or by the instruction read in the first multisignaller, this instruction serving to control the setting up of a space path between the first multisignaller and the junctor by sending, at the readout time of the first multisignaller, marking signals over conductors which by-pass the switching network so that the connection is established without using the space division path memories, each junctor including means for elaborating signals identifying respective ones of said frames, where these signals provide control information either for the collection of data stored in the selected address then the storage, in said address, of a new code transmitted by the first multisignaller in the case of an instruction or the storage in said address of a new code and the transfer to the first multisignaller of the code read in this address at the following frame in the case of an instruction, and that, in this last case, the instruction processing circuit controls the verification of the received code.

4. A switching system as claimed in claim 1 in which a first type of data transfer between the first multisignaller and a trunk concerns the supervision of signalling received over a channel of said trunk under the control of an instruction stored in the first multisignaller, that, for the said operations, a logical signalling circuit and a logical persistence circuit associated with the first multisignaller supply, at the end of selected periods, two informations characterizing respectively the value of the received signalling level and the fact that a level change has occurred in the channel, these informations being applied to instruction processing circuits provided for processing of selected instructions, a first instruction containing the measurement of the signalling level for a maximum duration of said selected periods and delivering an information of confirmed state of signalling if the level is the same during at least two of said selected periods and a further instruction controlling the test of the duration of a given signalling level during a predetermined interval the value of which is set by the computer.

5. A switching system as claimed in claim 1, in which additional data transfer between a first multisignaller and a trunk includes the transmission towards a switching center, of three digits, said transmission being controlled by an instruction.

6. A switching system according to claim 1, in which data transfer between said first and second multisignallers is through a space switching network and a time switching network in the PCM switching center for checking the space division and time division paths established between said two multisignallers, control of the space switching and time switching networks being established by an instruction stored in each of said multisignallers, said instruction being carried out by exchange of codes and comparison of the received code to the transmitted code in each multisignaller whereby the result of the comparison constitutes the result of the operation.

* * * * *